US009662629B2

(12) United States Patent
Olson et al.

(10) Patent No.: US 9,662,629 B2
(45) Date of Patent: May 30, 2017

(54) CARBON NANOCOMPOSITE SORBENT AND METHODS OF USING THE SAME FOR SEPARATION OF ONE OR MORE MATERIALS FROM A GAS STREAM

(71) Applicant: Energy & Environmental Research Center Foundation, Grand Forks, ND (US)

(72) Inventors: Edwin S. Olson, Grand Forks, ND (US); John Henry Pavlish, East Grand Forks, MN (US)

(73) Assignee: Energy & Environmental Research Center Foundation, Grand Forks, ND (US)

( * ) Notice: Subject to any disclaimer, the term of this patent is extended or adjusted under 35 U.S.C. 154(b) by 22 days.

(21) Appl. No.: 14/564,860

(22) Filed: Dec. 9, 2014

(65) Prior Publication Data
US 2015/0098878 A1 Apr. 9, 2015

Related U.S. Application Data

(63) Continuation of application No. 13/453,274, filed on Apr. 23, 2012, now Pat. No. 9,011,805.

(51) Int. Cl.
*B01J 20/22* (2006.01)
*B01J 20/12* (2006.01)
*B01D 53/02* (2006.01)
*B01J 20/30* (2006.01)
*B01J 20/32* (2006.01)
*B01J 20/20* (2006.01)
*B01D 53/50* (2006.01)
*B01D 53/80* (2006.01)

(52) U.S. Cl.
CPC .............. *B01J 20/12* (2013.01); *B01D 53/02* (2013.01); *B01D 53/508* (2013.01); *B01D 53/80* (2013.01); *B01J 20/20* (2013.01); *B01J 20/205* (2013.01); *B01J 20/3078* (2013.01); *B01J 20/3204* (2013.01); *B01J 20/324* (2013.01); *B01D 2251/108* (2013.01); *B01D 2253/102* (2013.01); *B01D 2253/108* (2013.01); *B01D 2253/11* (2013.01); *B01D 2253/25* (2013.01); *B01D 2253/304* (2013.01); *B01D 2258/0283* (2013.01)

(58) Field of Classification Search
CPC .................. B01J 20/20; B01D 53/508
See application file for complete search history.

(56) References Cited

U.S. PATENT DOCUMENTS

| 1,984,164 A | 12/1934 | Alfred |
| 2,317,857 A | 4/1943 | Soday |
| 3,194,629 A | 7/1965 | Dreibelbis et al. |
| 3,662,523 A | 5/1972 | Revoir et al. |
| 3,786,619 A | 1/1974 | Melkersson |
| 3,826,618 A | 7/1974 | Capuano |
| 3,849,267 A | 11/1974 | Hilgen et al. |
| 3,876,393 A | 4/1975 | Kasai et al. |
| 4,094,777 A | 6/1978 | Sugier et al. |
| 4,101,631 A | 7/1978 | Ambrosini et al. |
| 4,196,173 A | 4/1980 | deJong et al. |
| 4,338,896 A | 7/1982 | Papasideris |
| 4,500,327 A | 2/1985 | Nishino et al. |
| 4,708,853 A | 11/1987 | Matviya et al. |
| 4,772,455 A * | 9/1988 | Izumi ............... B01D 53/02 423/210 |
| 4,786,483 A | 11/1988 | Audeh |
| 4,814,152 A | 3/1989 | Yan |
| 4,820,318 A | 4/1989 | Chang et al. |
| 4,889,698 A | 12/1989 | Moller et al. |
| 4,956,162 A | 9/1990 | Smith et al. |
| 5,300,137 A | 4/1994 | Weyand et al. |
| 5,336,835 A | 8/1994 | McNamara |
| 5,409,522 A | 4/1995 | Durham et al. |
| 5,462,908 A | 10/1995 | Liang et al. |
| 5,505,766 A | 4/1996 | Chang |
| 5,575,982 A | 11/1996 | Reiss et al. |
| 5,607,496 A | 3/1997 | Brooks |
| 5,672,323 A | 9/1997 | Bhat et al. |
| 5,695,726 A | 12/1997 | Lerner |
| 5,827,352 A | 10/1998 | Altman et al. |
| 5,891,324 A | 4/1999 | Ohtsuka |
| 6,027,551 A | 2/2000 | Hwang et al. |
| 6,074,974 A * | 6/2000 | Lee ................ B01D 53/02 502/416 |
| 6,080,281 A | 6/2000 | Attia |

(Continued)

FOREIGN PATENT DOCUMENTS

CA 1099490 A1 4/1981
CA 2150529 A1 12/1995
(Continued)

OTHER PUBLICATIONS

Machine english translation of DE202012003747U1.
"U.S. Appl. No. 14/195,360, Final Office Action mailed Mar. 18, 2016", 18 pgs.
"U.S. Appl. No. 14/195,360, Non Final Office Action mailed Nov. 24, 2015", 19 pgs.
"U.S. Appl. No. 14/195,360, Response filed Feb. 22, 2016 to Non Final Office Action mailed Nov. 24, 2015", 21 pgs.
"Canadian Application Serial No. 2,871,422, Response filed Feb. 26, 2016 to Office Action mailed Sep. 9, 2015", 13 pgs.
(Continued)

*Primary Examiner* — Stuart Hendrickson
(74) *Attorney, Agent, or Firm* — Schwegman Lundberg & Woessner, P.A.

(57) ABSTRACT

The present invention relates to carbon nanocomposite sorbents. The present invention provides carbon nanocomposite sorbents, methods for making the same, and methods for separation of a pollutant from a gas that includes that pollutant. Various embodiments provide a method for reducing the mercury content of a mercury-containing gas.

16 Claims, 6 Drawing Sheets

(56) References Cited

U.S. PATENT DOCUMENTS

| | | |
|---|---|---|
| 6,136,072 A | 10/2000 | Sjostrom et al. |
| 6,136,749 A | 10/2000 | Gadkaree et al. |
| 6,214,304 B1 | 4/2001 | Rosenthal et al. |
| 6,258,334 B1 | 7/2001 | Gadkaree et al. |
| 6,372,187 B1 | 4/2002 | Madden et al. |
| 6,375,909 B1 | 4/2002 | Dangtran et al. |
| 6,383,981 B1 | 5/2002 | Blankenship et al. |
| 6,471,936 B1 | 10/2002 | Chen et al. |
| 6,528,030 B2 | 3/2003 | Madden et al. |
| 6,638,485 B1 | 10/2003 | Iida et al. |
| 6,808,692 B2 | 10/2004 | Oehr |
| 6,818,043 B1 | 11/2004 | Chang et al. |
| 6,848,374 B2 | 2/2005 | Srinivasachar et al. |
| 6,878,358 B2 | 4/2005 | Vosteen et al. |
| 6,942,840 B1 | 9/2005 | Broderick |
| 6,953,494 B2 | 10/2005 | Nelson, Jr. et al. |
| 6,960,329 B2 | 11/2005 | Sellakumar |
| 7,081,434 B2 | 7/2006 | Sinha |
| 7,211,707 B2 | 5/2007 | Axtell et |
| 7,435,286 B2 | 10/2008 | Olson et al. |
| 7,479,263 B2 | 1/2009 | Chang et al. |
| 7,514,052 B2 | 4/2009 | Lissianski et al. |
| 7,521,032 B2 | 4/2009 | Honjo et al. |
| 7,544,338 B2 | 6/2009 | Honjo et al. |
| 7,563,311 B2 | 7/2009 | Graham |
| 7,611,564 B2 | 11/2009 | Mcchesney et al. |
| 7,622,092 B2 | 11/2009 | Honjo et al. |
| 7,722,843 B1 | 5/2010 | Srinivasachar |
| 7,767,174 B2 | 8/2010 | Lui et al. |
| 7,780,765 B2 | 8/2010 | Srinivasachar et al. |
| 8,007,749 B2 | 8/2011 | Chang et al. |
| 8,080,088 B1 * | 12/2011 | Srinivasachar ........ B01D 53/02 502/417 |
| 8,168,147 B2 | 5/2012 | Olson et al. |
| 8,168,149 B2 | 5/2012 | Gal et al. |
| 8,216,535 B2 | 7/2012 | Pollack et al. |
| 8,512,655 B2 | 8/2013 | Olson et al. |
| 8,652,235 B2 | 2/2014 | Olson et al. |
| 8,821,819 B2 | 9/2014 | Olson et al. |
| 9,011,805 B2 | 4/2015 | Olson et al. |
| 2001/0002387 A1 | 5/2001 | Tsutsumi et al. |
| 2001/0003116 A1 | 6/2001 | Neufert |
| 2002/0043496 A1 | 4/2002 | Boddu et al. |
| 2002/0134242 A1 | 9/2002 | Yang et al. |
| 2002/0150516 A1 | 10/2002 | Pahlman et al. |
| 2003/0104937 A1 | 6/2003 | Sinha |
| 2003/0136509 A1 | 7/2003 | Virtanen |
| 2004/0003716 A1 | 1/2004 | Nelson, Jr. |
| 2004/0013589 A1 | 1/2004 | Vosteen et al. |
| 2004/0076570 A1 | 4/2004 | Jia |
| 2005/0019240 A1 | 1/2005 | Lu et al. |
| 2006/0048646 A1 | 3/2006 | Olson et al. |
| 2006/0191835 A1 | 8/2006 | Petrik et al. |
| 2008/0090951 A1 | 4/2008 | Mao et al. |
| 2008/0182747 A1 | 7/2008 | Sinha |
| 2008/0292512 A1 | 11/2008 | Kang |
| 2009/0062119 A1 | 3/2009 | Olson et al. |
| 2009/0136401 A1 | 5/2009 | Yang et al. |
| 2009/0235848 A1 | 9/2009 | Eiteneer et al. |
| 2009/0320678 A1 | 12/2009 | Chang et al. |
| 2010/0047146 A1 | 2/2010 | Olson et al. |
| 2011/0076210 A1 | 3/2011 | Pollack et al. |
| 2011/0168018 A1 | 7/2011 | Mohamadalizadeh et al. |
| 2012/0183458 A1 | 7/2012 | Olson et al. |
| 2013/0280156 A1 | 10/2013 | Olson et al. |
| 2014/0056787 A1 | 2/2014 | Olson et al. |
| 2014/0224121 A1 | 8/2014 | Mimna et al. |
| 2014/0255279 A1 | 9/2014 | Olson et al. |
| 2014/0308188 A1 | 10/2014 | Olson et al. |

FOREIGN PATENT DOCUMENTS

| | | |
|---|---|---|
| CA | 2400898 A1 | 8/2001 |
| CN | 101053820 A | 10/2007 |
| CN | 101293196 A | 10/2008 |
| CN | 101816922 A | 9/2010 |
| CN | 102413899 A | 4/2012 |
| CN | 105188910 A | 12/2015 |
| CN | 104619410 B | 5/2016 |
| DE | 3426059 A1 | 1/1986 |
| DE | 10233173 A1 | 2/2004 |
| DE | 202012003747 U1 | 11/2012 |
| EP | 0208490 A1 | 1/1987 |
| EP | 1570894 A1 | 9/2005 |
| FR | 2529802 | 1/1984 |
| JP | 49-053590 A | 5/1974 |
| JP | 49-53593 A | 5/1974 |
| JP | 49-66592 A | 6/1974 |
| JP | 49-043197 B4 | 11/1974 |
| JP | 50-6438 B4 | 3/1975 |
| JP | 51-3386 A | 1/1976 |
| JP | 544868 A | 1/1979 |
| JP | 54004868 B | 1/1979 |
| SU | 732207 A1 | 5/1980 |
| SU | 1163982 A | 6/1985 |
| WO | WO-01/62368 A1 | 8/2001 |
| WO | WO-2004/089501 A2 | 10/2004 |
| WO | WO-2013/162968 A2 | 10/2013 |
| WO | WO-2013/162968 A3 | 10/2013 |
| WO | WO-2014/137907 A2 | 9/2014 |

OTHER PUBLICATIONS

"Chinese Application Serial No. 201380033231.6, Response filed Jan. 14, 2016 to Office Action Sep. 21, 2015", (w/ English Translation of Claims), 7 pgs.

Bimer, Jan, et al., "Modified active carbons from precursors enriched with nitrogen functions: sulfur removal capabilities", (1998), 519-525.

Kawabuchi, Yuji, et al., "Chemical vapor deposition of heterocyclic compounds over active carbon fiber to control its porosity and surface function", Langmuir 13.8, (1997), 2314-2317.

Nickels, Dale L, et al., "Processing and reuse of activated carbon used to adsorb mercury from power plant flue gases", Final report, (2004).

Rachel, Ribeirovieira Azzi Rios, et al., "Tailoring Activated Carbon by Surface Chemical Modification with O, S, and N Containing Molecules", Materials Research. 6 (2), (2003), 129-135.

"Application Serial No. PCT/US2014/019916, International Preliminary Report on Patentability mailed Sep. 17, 2015", 14 pgs.

"Canadian Application No. 2,871,422, Office Action mailed Apr. 2, 2015", 5 pgs.

"Canadian Application No. 2,871,422, Office Action mailed Sep. 9, 2015", 3 pgs.

"Canadian Application Serial No. 2,871,422, Response filed Aug. 28, 2015 to Canadian Office Action mailed Apr. 2, 2015", 22 pgs.

"Chinese Application Serial No. 201380033231.6, Office Action mailed Sep. 21, 2015". (w/ Partial English Translation), 6 pgs.

"European Application Serial No. 13719338.9, Office Action mailed Dec. 19, 2014", 2 pgs.

"European Application Serial No. 13719338.9, Response filed Jun. 29, 2015 to Office Action mailed Dec. 19, 2014", 19 pgs.

"U.S. Appl. No. 11/209,163, Advisory Action mailed Apr. 21, 2008", 3 pgs.

"U.S. Appl. No. 11/209,163, Final Office Action mailed Jan. 23, 2008", 20 pgs.

"U.S. Appl. No. 11/209,163, Non Final Office Action mailed Aug. 13, 2007", 14 pgs.

"U.S. Appl. No. 11/209,163, Notice of Allowance mailed Jul. 14, 2008", 7 pgs.

"U.S. Appl. No. 11/209,163, Preliminary Amendment filed Feb. 27, 2007", 9 pgs.

"U.S. Appl. No. 11/209,163, Response filed Mar. 24, 2008 to Final Office Action mailed Jan. 23, 2008", 29 pgs.

"U.S. Appl. No. 11/209,163, Response filed Jul. 9, 2007 to Restriction Requirement mailed Jun. 7, 2007", 2 pgs.

"U.S. Appl. No. 11/209,163, Response filed Nov. 13, 2007 to Non Final Office Action mailed Aug. 13, 2007", 19 pgs.

(56) References Cited

OTHER PUBLICATIONS

"U.S. Appl. No. 11/209,163, Restriction Requirement mailed Jun. 7, 2007", 6 pgs.
"U.S. Appl. No. 12/201,595, Final Office Action mailed Mar. 10, 2010", 13 pgs.
"U.S. Appl. No. 12/201,595, Non Final Office Action mailed Apr. 16, 2009", 21 pgs.
"U.S. Appl. No. 12/201,595, Response filed Oct. 16, 2009 to Non Final Office Action mailed Apr. 16, 2009", 18 pgs.
"U.S. Appl. No. 12/419,219, Final Office Action mailed Oct. 14, 2010", 17 pgs.
"U.S. Appl. No. 12/419,219, Non Final Office Action mailed Jan. 15, 2010", 13 pgs.
"U.S. Appl. No. 12/419,219, Non Final Office Action mailed Feb. 23, 2011", 17 pgs.
"U.S. Appl. No. 12/419,219, Non Final Office Action mailed Aug. 4, 2011", 16 pgs.
"U.S. Appl. No. 12/419,219, Notice of Allowance Mailed Jan. 10, 2012", 7 pgs.
"U.S. Appl. No. 12/419,219, Preliminary Amendment filed Apr. 6, 2009", 7 pgs.
"U.S. Appl. No. 12/419,219, Response filed Feb. 14, 2011 to Final Office Action mailed Oct. 14, 2010", 19 pgs.
"U.S. Appl. No. 12/419,219, Response filed May 20, 2011 to Non Final Office Action mailed Feb. 23, 2011", 14 pgs.
"U.S. Appl. No. 12/419,219, Response filed Jul. 15, 2010 to Non Final Office Action mailed Jan. 15, 2010", 22 pgs.
"U.S. Appl. No. 12/419,219, Response filed Oct. 27, 2011 to Non Final Office Action mailed Aug. 4, 2011", 12 pgs.
"U.S. Appl. No. 13/427,665, Non Final Office Action mailed Jan. 4, 2013", 23 pgs.
"U.S. Appl. No. 13/427,665, Non Final Office Action mailed Aug. 3, 2012", 12 pgs.
"U.S. Appl. No. 13/427,665, Notice of Allowance mailed Apr. 16, 2013", 8 pgs.
"U.S. Appl. No. 13/427,665, Response filed Mar. 21, 2013 to Non Final Office Action mailed Jan. 4, 2013", 20 pgs.
"U.S. Appl. No. 13/427,665, Response filed Oct. 10, 2012 to Non Final Office Action mailed Aug. 3, 2012", 15 pgs.
"U.S. Appl. No. 13/427,685, Preliminary Amendment filed Mar. 22, 2012", 3 pgs.
"U.S. Appl. No. 13/453,274, Advisory Action mailed Nov. 24, 2014", 3 pgs.
"U.S. Appl. No. 13/453,274, Final Office Action mailed Oct. 16, 2014", 4 pgs.
"U.S. Appl. No. 13/453,274, Non Final Office Action mailed May 30, 2014", 6 pgs.
"U.S. Appl. No. 13/453,274, Notice of Allowance mailed Jan. 5, 2015", 5 pgs.
"U.S. Appl. No. 13/453,274, Response filed Sep. 2, 2014 to Non Final Office Action mailed May 30, 2014", 13 pgs.
"U.S. Appl. No. 13/453,274, Response filed Nov. 6, 2014 to Final Office Action mailed Oct. 16, 2014", 7 pgs.
"U.S. Appl. No, 13/453,274, Response filed Dec. 9, 2014 to Advisory Action mailed Nov. 24, 2014", 6 pgs.
"U.S. Appl. No. 13/966,768, Non Final Office Action mailed Dec. 6, 2013", 7 pgs.
"U.S. Appl. No. 13/966,768, Notice of Allowability mailed Aug. 1, 2014", 6 pgs.
"U.S. Appl. No. 13/966,768, Notice of Allowance mailed Apr. 18, 2014", 7 pgs.
"U.S. Appl. No. 13/966,768, Preliminary Amendment filed Aug. 14, 2013", 3 pgs.
"U.S. Appl. No. 13/966,768, Response filed Mar. 6, 2014 to Non Final Office Action mailed Dec. 6, 2013", 6 pgs.
"U.S. Appl. No. 13/966,768, Supplemental Preliminary Amendment filed Aug. 15, 2013", 6 pgs.
*Bromine and its Compounds*, Jolles, Z. E., Editor, Academic Press, Inc., New York, NY, (1966), pp. 193 and 205.
i"Canadian Application Serial No. 2,584,327, Office Action mailed Mar. 3, 2009", 4 pgs.
"European Application Serial No. 05814011.2, Response filed Sep. 9, 2011 to European Search Report mailed Apr. 14, 2009 and Office Actioin mailed Nov. 5, 2009", 20 pgs.
"European Application Serial No. 05814011.2, Office Action mailed Jan. 25, 2008", 2 pgs.
"European Application Serial No. 05814011.2, Office Action mailed Nov. 5, 2009", 2 pgs.
"European Application Serial No. 05814011.2, Partial European Search Report mailed Apr. 14, 2009", 13 pgs.
"European Application Serial No. 05814011.2, Response filed Apr. 18, 2008 to Office Action mailed Jan. 25, 2008 and Third Party Observations submitted Dec. 4, 2007", 7 pgs.
"European Application Serial No. 05814011.2, Response filed May 11, 2010 to Office Action mailed Nov. 5, 2009", 11 pgs.
"European Application Serial No. 05814011.2, Third Party Observations submitted Mar. 19, 2012", 7 pgs.
"European Application Serial No. 05814011.2, Third Party Observations submitted Dec. 4, 2007", 5 pgs.
"International Application Serial No. PCT/US2013/036964, International Preliminary Report on Patentability mailed Jul. 17, 2014", 11 pgs.
"International Application Serial No. PCT/US2013/036964, International Search Report mailed Nov. 29, 2013", 7 pgs.
"International Application Serial No. PCT/US2013/036964, Invitation to Pay Additional Fees and Partial Search Report mailed Aug. 2, 2013", 7 pgs.
"International Application Serial No. PCT/US2013/036964, Written Opinion mailed Apr. 15, 2014", 10 pgs.
"International Application Serial No. PCT/US2013/036964, Written Opinion mailed Nov. 29, 2013", 13 pgs.
"International Application Serial No. PCT/US2014/019916, International Search Report mailed Oct. 13, 2014", 6 pgs.
"International Application Serial No. PCT/US2014/019916, Invitation to Pay Additional Fees and Partial Search Report mailed May 30, 2014", 6 pgs.
"International Application Serial No. PCT/US2014/019916, Written Opinion mailed Oct. 13, 2014", 12 pgs.
Bakandritsos, A., et al., "Aqueous and Gaseous Adsorption from Montmorillonite-Carbon Composites and from Derived Carbons", *Langmuir*, 21, (2005), 2349-2355.
Bakandritsos, A., et al., "High Surface Area Montmorillonite—Carbon Composites and Derived Carbons", *Chemistry of Materials*, vol. 16, No. 8, (Mar. 16, 2004), 1551-1559.
Chang, Shih-Ger, "Method for Oxidation of Mercury Vapor", U.S. Appl. No. 60/560,904, filed Apr. 9, 2004, (Apr. 9, 2004), 9 pgs.
Criswell, Gordon, et al., "Progress Report on Mercury Control Retrofit at the Colstrip Power Station", Paper #91, *Mega Symposium*, Baltimore, MD, (Aug. 2011), 1-23.
Darder, M., et al., "Caramel-clay nanocomposites", *Journal of Materials Chemistry*, 15, (2005), 3913-3913.
Dong, J., et al., "Mercury Removal from Flue Gases by Novel Regenerable Magnetic Nanocomposite Sorbents", *Environ. Sci. Technol.*, 43, (2009), 3266-3271.
Dunham, G. E., et al., "Mercury Capture by an Activated Carbon in a Fixed-Bed Bench-Scale System", *Environmental Progress*, 17(3), (1998), 203-208.
Eisazadeh, H,, "Removal of Mercury from Water Using Polypyrrole and its Composites", *Chinese Journal of Polymer Science*, 25(4), (2007), 393-397.
Felsvang, K., et al., "Mercury Reduction and Control Options", The U.S, EPA-DOE-EPRI Combined Power Plant Air Pollutant Control Symposium; *The Mega Symposium and The A&WMA Specialty Conference and Mercury Emissions: Fate, Effects and Control*; Chicago, IL, (Aug. 2001), 1-19.
Fernandez-Saavedra, R., et al., "Polymer-Clay Nanocomposites as Precursors of Nanostructured Carbon Materials for Electrochemical Devices: Templating Effect of Clays", *Journal of Nanoscience and Nanotechnology*, 8, (2008), 1741-1750.
Ghorbani, M., et al., "Application of polyaniline nanocomposite coated on rice husk ash for removal of Hg(II) from aqueous media", *Synthetic Metals*, (2001), 4 pgs.

(56) References Cited

OTHER PUBLICATIONS

Ghorishi, Behrooz, et al., "Sorption of Mercury Species by Activated Carbons and Calcium-Based Sorbents: Effect of Temperature, Mercury Concentration and Acid Gases", *Waste Manage. Res.*, 16:6, (1998), 582-593.

Gomez-Aviles, A., et al., "Functionalized Carbon-Silicates from Caramel-Sepiolite Nanocomposites", *Agnew. Chem. Int. Ed.*, 46, (2007), 923-925.

Gomez-Aviles, A., et al., "Multifunctional materials based on graphene-like/sepiolite nanocomposites", *Applied Clay Science*, 47, (2010), 203-211.

Ikeue, K., et al., "Noble-metal-containing nanoporous carbon synthesized within the interlayer space of montmorillonite and its catalytic property", *Applied Catalysis A: General*, 351, (2008), 68-74.

Kyotani, T., et al., "Formation of highly orientated graphite from polyacrylonitrile by using a two-dimensional space between montmorillonite lamellae", *Nature*, 331, (1938), 331-333.

Lancia, A., et al., "Adsorption of Mercuric Chloride Vapours from Incinerator Flue Gases on Calcium Hydroxide Particles", *Combust. Sci. & Tech.*, 93, (1993), 277-289.

Laumb, Jason D., et al., "X-ray photoelectron spectroscopy analysis of mercury sorbent surface chemistry", *Food Processing Technology*, 85, (2004), 577-585.

Li, Y., et al., "Removal of elemental mercury from simulated coal-combustion flue gas using a $SiO_2$—$TiO_2$ nanocomposite", *Fuel Processing Technology*, 89, (2008), 567-573.

Mochida, I., et al., "Preparation of nitrogen containing pitches from quinoline and isoquinoline by AID of $AlCl_3$", *Carbon*, 33(8), (1995), 1069-1077.

Nguyen-Thanh, D., et al., "High Porosity Carbonaceous Adsorbents Templated From Porous Clay Heterostructures", *Prepr. Pap.-Am. Chem. Soc., Div. Fuel Chem.*, 51(1), (2006), 7-8.

Nguyen-Thanh, D., et al., "Metal-loaded carbonaceous adsorbents templated from porous clay heterostructures", *Microporous and Mesoporous Materials*, 92, (2006), 47-55.

Olson, David G., et al., "The Reduction of Gas Phase Air Toxics from Combustion and Incineration Sources using the MET-Mitsui-BF Activated Coke Process", *Fuel Processing Technology*, 65-66, (2000), 393-405.

Olson, E. S., et al., "Catalytic effects of carbon sorbents for mercury capture". *Journal of Hazardous Materials*, 74, (2000), 61-79.

Olson, Edwin S., et al., "Surface Compositions of Carbon Sorbents Exposed to Simulated Low-Rank Coal Flue Gases", *J. Air & Water Waste Manage. Assoc.*, 55, (2005), 747-754.

Vosteen, B, et al., "Chlor-und Bromgestutzte Hg-Sorption an Elektrofilter-Flugaschen eines kohlegefeuerten Schmelzkarnmerkessels und an Zementrohmehl", Matin-Luther-Universitat Halle-Wittenberg, (2003), 1-30.

Vosteen, B. W., et al., Flyer on Mercury Abatement given at the VDI-Wissensforum, Dusseldorf,Germany, (2003), 6 pgs.

Vosteen, B. W., "Bromine-enhanced Mercury Abatement from Combustion Flue Gases—Recent Industrial Applications and Laboratory Research", *VGB PowerTech*, vol. 86, Issue Mar. 2006, (2006), 70-75.

Vosteen, N., "Emissionsminderung von Quecksilber durch chlor- und bromgestutzte Hg-Oxidation in Rauchgas", (Sep. 2003), 1-23.

Wan, Q., et al., "Removal of gaseous elemental mercury over a $CeO_2$—$WO_3/TiO_2$ nanocomposite in simulated coal-fired flue gas", *Chemical Engineering Journal*, 170, (2011), 512-517.

Wang, B., et al., "Performance of a diatomite-based sorbent in removing mercury from aqueous and oil matrices", *J. Environ. Eng. Sci.*, 6, (2007), 469-476.

Zhang, Y., et al., "High efficient removal of mercury from aqueous solution by polyaniline/humic acid nanocomposite", *Journal of Hazardous Materials*, 175, (2010), 404-409.

Zhao, Yongxin, et al., "Effectsof SulfurDioxide and Nitric Oxide on Mercury Oxidation and Reducton under Homogeneous Conditions", *J. Air & Waste Manage. Assoc.*, 56, (2006), 628-635.

Zheng, Yuanjing, et al., "Review of technologies for mercury removal from flue gas from cement production processes", *Progress in Energy and Combustion Science*, vol. 38, No. 5, (Apr. 26, 2012), 599-629.

"U.S. Appl. No. 14/195,360, Non Final Office Action mailed Jun. 20, 2016", 11 pgs.

"U.S. Appl. No. 14/195,360, Response filed May 17, 2016 to Final Office Action mailed Mar. 18, 2016", 15 pgs.

"U.S. Appl. No. 14/195,360, Response filed Sep. 16, 2016 to Non Final Office Action mailed Jun. 30, 2016", 12 pgs.

"Chinese Application Serial No. 201480025701.9, Office Action mailed Jul. 25, 2016", (With English Translation), 4 pgs.

Arenillas, A, et al., "CO2 removal potential of carbons prepared by co-pyrolysis of sugar and nitrogen containing compounds", Journal of analytical and applied pyrolysis 74.1, (2005), 298-306.

Diamantopoulou, LR G Skodras, et al., "Sorption of mercury by activated carbon in the presence of flue gas components", Fuel Processing Technology 91.2, (2010), 158-163.

Raymundo-Pinero, E, et al., "Structural characterization of N-containing activated carbon fibers prepared from a low softening point petroleum pitch and a melamine resin", Carbon 40.4, (2002), 597-608.

"Chinese Application Serial No. 201480025701.9, Office Action mailed Dec. 23, 2016", W/English Translation, 39 pgs.

"U.S. Appl. No. 14/195,360, Corrected Notice of Allowance mailed Feb. 27, 2017", 2 pgs.

"U.S. Appl. No. 15/452,527, Preliminary Amendment filed Mar. 8, 2017", 3 pgs.

\* cited by examiner

CARBON NANOCOMPOSITE SORBENT AND METHODS OF USING THE SAME FOR SEPARATION OF ONE OR MORE MATERIALS FROM A GAS STREAM

CLAIM OF PRIORITY

This application is a continuation application which claims the benefit of U.S. patent application Ser. No. 13/453,274, filed Apr. 23, 2012, which is incorporated herein by reference in its entirety.

STATEMENT OF GOVERNMENT SUPPORT

This invention was made with government support awarded by the U.S. Department of Energy (DOE) under DOE Cooperative Agreement Number DE-FC26-08NT43291 entitled "EERC-DOE Joint Program on Research and Development for Fossil Energy-Related Resources"; Subtask 4.8 entitled "Fate and Control of Mercury and Trace Elements"; EERC Fund Number 14990. The government has certain rights in this invention.

BACKGROUND OF THE INVENTION

Mercury (Hg) emissions have become a health and environmental concern because of their toxicity and ability to bioaccumulate. The U.S. Environmental Protection Agency (EPA) has issued regulations for the control of Hg emissions from waste-to-energy, cement production, and coal-fired power plants. Mercury in flue gas from industrial sources (e.g., power plants) can be captured by injection of sorbents such as activated carbon, which can then be removed by particulate collection devices. The amount of standard sorbents (e.g., activated carbon) needed to serve the market is large. Standard sorbents are not always effective and become more expensive as injection rates increase.

A nanocomposite is a multiphase solid material in which one of the phases has at least one dimension of less than about 1000 nm or in which less than an about 1000 nm repeat distance separates the phases that make up the material. Nanocomposites in which one or more of the phases is a bulk matrix and one or more other materials is a nanodimensional phase can have unique properties, with the mechanical, electrical, thermal, optical, chemical, or catalytic properties of the nanocomposite material differing significantly from that of the individual component materials.

The first examples of carbon nanocomposites were prepared by intercalating monomers into interlamellar spaces in clays, polymerizing the monomer, and carbonizing the polymer. The minimum thickness of the carbon layer was 1.1 nm (Kyotani-1988). In the next two decades, a variety of monomers were employed with several clays and other porous support materials. In some cases, the inorganic part of the composite was removed to study the graphite-like carbon structures. In 2004, Bakandritsas et al. produced carbon-clay nanocomposites using sucrose as the carbon source (Bakandritsas-2004). The thickness of each layer was about 1 nm and 0.4 nm for the clay and graphene layers, respectively. Later, this group described the use of these for adsorption of gases ($CO_2$, $CH_4$, $N_2$) and organic solutes in aqueous solutions (Bakandritsas-2005). Because they can be easily shaped, have high surface-areas, and conduct electricity, carbon-clay nanocomposites from sucrose were used to produce electrodes and sensors (Darder-2005, Gomez-Aviles-2007, Fernandez-Saavedra-2008, Gomez-Aviles-2010). The porous carbon-clay nanocomposites from sucrose also have been utilized for catalyst supports (Nguyen-Thanh-2006a, Nguyen-Thanh-2006b, Ikeue-2008).

Several applications of composite materials for adsorption of metal ions such as $Hg^{2+}$ have been described in the literature. These include the following materials: chitosan-coated ceramic (Boddu-2002), polypyrrole film on clay (Eisazadeh-2007), mercapto-functionalized polysiloxane film on diatoms (Wang-2007), polyaniline film on ash (Ghorbani-2011), and polyaniline composite with humic acid (Zhang). None of these is a carbon nanocomposite; rather, they are typically a polymer film deposited on a support and suffer limitations from stability and difficulty of recycling and processing.

Separation of elemental or oxidized mercury from a gas stream has been conducted with several types of nanocomposites made with non-carbon materials. A $SiO_2$—$TiO_2$ nanocomposite was used for Hg capture under UV radiation (Li-2008). This technology suffers from the difficulty of having to effectively irradiate combustion effluent containing fine particulate. A magnetite- and Ag-impregnated zeolite nanocomposite was described (Dong-2009). It is suspected that the Ag nanocomposite represents a significant environment risk in itself, as well as being a high-cost sorbent. Capture of Hg in flue gas with a $CeO_2$—$WO_3/TiO_2$ nanocomposite was reported (Wan-2011). These non-carbon sorbents have higher cost and slower kinetics than desirable.

SUMMARY OF THE INVENTION

In various embodiments, the present invention provides a method for separating a material from a gas that includes the material. In some embodiments, the material can be a pollutant or an unwanted constituent of the gas. The method includes providing or obtaining a carbon nanocomposite sorbent. The method also includes contacting at least some of the material with the sorbent to form a material-sorbent composition. The method also includes separating at least some of the material-sorbent composition from the material-containing gas. The separation gives a separated or partially separated gas.

In various embodiments, the present invention provides a method for reducing the pollutant content of a pollutant-containing gas. The method includes providing or obtaining a carbon nanocomposite sorbent. The method includes providing or obtaining a halogen or halide promoter. The method includes promoting at least a portion of the sorbent material. The promoting of the sorbent material includes chemically reacting the portion of the sorbent material with the halogen or halide promoter. The promoting of the sorbent material gives a promoted sorbent. The method includes contacting at least part of the promoted sorbent with the pollutant. In some embodiments, the method can also include contacting the pollutant with sorbent that is unpromoted. Contacting the promoted sorbent with the pollutant forms a pollutant-sorbent composition. The method also includes separating at least some of the pollutant-sorbent composition. The separation gives a cleaned gas, having a lower pollutant content than the starting material (e.g., uncleaned) pollutant-containing gas. In various embodiments, the pollutant can be mercury.

In various embodiments, the present invention provides a method of forming a carbon nanocomposite material. The method includes obtaining or providing a carbon precursor material. The method includes providing or obtaining a substrate material. The method includes contacting the carbon precursor and the substrate material to provide a nanocomposite starting material. The method also includes heating the nanocomposite starting material to provide the carbon nanocomposite sorbent. In various embodiments, the present invention provides the carbon nanocomposite that is generated by the method. In some examples, the present invention provides the nanocomposite in combination with various materials the nanocomposite encounters during performance of the method, such as the nanocomposite in combination with mercury, with oxidized mercury, or with a mercury-containing gas. In some embodiments, the method can include adding a halogen or halide promoter and allowing the promoter to react with the sorbent to form a promoted carbon nanocomposite sorbent.

Surprisingly, despite activated carbons being routinely used to capture pollutants in flue gas streams, carbon nanocomposites have not been used before for gas-phase mercury capture. Traditional thinking is that an excess of inorganic support such as clay in the carbon nanocomposite hinders the sorption of the pollutant on the carbon. However, surprisingly, in accord with some embodiments of the present invention, the non-carbon parts can enhance the sorption of pollutant on the proximate carbon graphene layer. The basal planes of the carbon portions of the nanocomposites are indeed largely hindered within carbon nanocomposite structures. However, the carbon edge structures are very well exposed in the structures, and these are the part of the carbon that is active for pollutant capture (e.g., mercury, selenium, arsenic, and the like). As described herein, the graphene edge structures can be promoted by reaction with a halogen, hydrogen halide, or ammonium halide to produce a carbocation edge structure that is highly reactive for oxidation and capture of pollutants such as mercury.

Since support materials such as clays are by themselves inert, the promotion of oxidation of pollutants by the carbon layer caused by certain support materials is also unexpected. However, in accord with some embodiments of the present invention, a polyanionic aluminosilicate layer (e.g., from clay) can stabilize the development of cationic sites on the proximate graphene carbon structures that are essential for oxidation of pollutants such as mercury. The same stabilizing effect can occur with a carbon-diatom (silicate) nanocomposite or other nanocomposites composed of graphene layers and polar inorganic structures.

In embodiments that include a nanocomposite that is promoted via hydrogen halide compound obtained from degradation or reaction of the corresponding ammonium halide, another advantageous role for the inorganic portion can be in providing a binding site for the ammonia that is released from either the decomposition or reaction of the ammonium salt. The bound ammonia forms a complex with basic character that reacts with $SO_2$ in the flue gas and prevents their interference with the capture on the edge structure of pollutants such as mercury.

In another advantage of inorganic support in embodiments that include clay as the support, the clay is stabilized to dispersion in an aqueous medium. Clays are usually difficult to filter or separate from an aqueous medium, but in the form of a nanocomposite with carbon, the material can be easily separated from an aqueous medium by filtration. Thus, the nanocomposite can be conveniently utilized to capture mercury in an aqueous environment.

The present invention advantageously can separate a material (e.g., a pollutant) from a gas that includes that material more efficiently than other methods. The present invention provides certain advantages over other methods and materials for the removal of mercury from mercury-containing gas. The method and materials of various embodiments of the present invention can capture and remove mercury from a gas more efficiently than other methods of mercury removal. The method and materials of various embodiments of the present invention can operate more efficiently than other methods of mercury removal. For example, the method and materials of various embodiments can remove a given amount of mercury for a smaller amount of financial expenditure, as compared to other methods. For example, the method and materials of various embodiments can remove a larger amount of mercury for a given mass of carbon, as compared to other methods of removing mercury, including as compared to other methods of removing mercury that include a carbon sorbent. Thus, the method and materials of various embodiments can result in the use of less sorbent material (e.g., less carbon overall), as well as the disposal of less used sorbent material, than other methods of mercury removal.

In various embodiments, the present invention provides a method for reducing the mercury content of a mercury-containing gas. The method includes providing or obtaining a carbon nanocomposite sorbent. The carbon nanocomposite sorbent is made by steps including providing or obtaining a carbon precursor and providing or obtaining a substrate material. The steps also include contacting the carbon precursor and the substrate material. The contacting provides a nanocomposite starting material. The steps also include heating the nanocomposite starting material. The heating provides the carbon nanocomposite sorbent. The method for reducing mercury content of the mercury-containing gas also includes providing or obtaining a halogen or halide promoter. The method includes promoting at least a portion of the sorbent material. The promoting of the sorbent material includes chemically reacting the portion of the sorbent material with the halogen or halide promoter. The promoting of the sorbent material gives a promoted sorbent. The method includes contacting at least part of the promoted sorbent with the mercury. Contacting the promoted sorbent with the mercury forms a mercury-sorbent composition. The method also includes separating at least some of the mercury-sorbent composition from the gas. The separation gives a cleaned gas, having a lower mercury content than the uncleaned gas.

In various embodiments, the present invention provides a method of making a carbon nanocomposite sorbent. The method includes providing or obtaining a carbon precursor. The method includes providing or obtaining a substrate material. The method includes contacting the carbon precursor and the substrate material. Contacting the carbon precursor and the substrate material provides a nanocomposite starting material. The method also includes heating the nanocomposite starting material. Heating the nanocomposite starting material provides the carbon nanocomposite sorbent.

BRIEF DESCRIPTION OF THE FIGURES

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

DETAILED DESCRIPTION OF THE INVENTION

Figure 1:
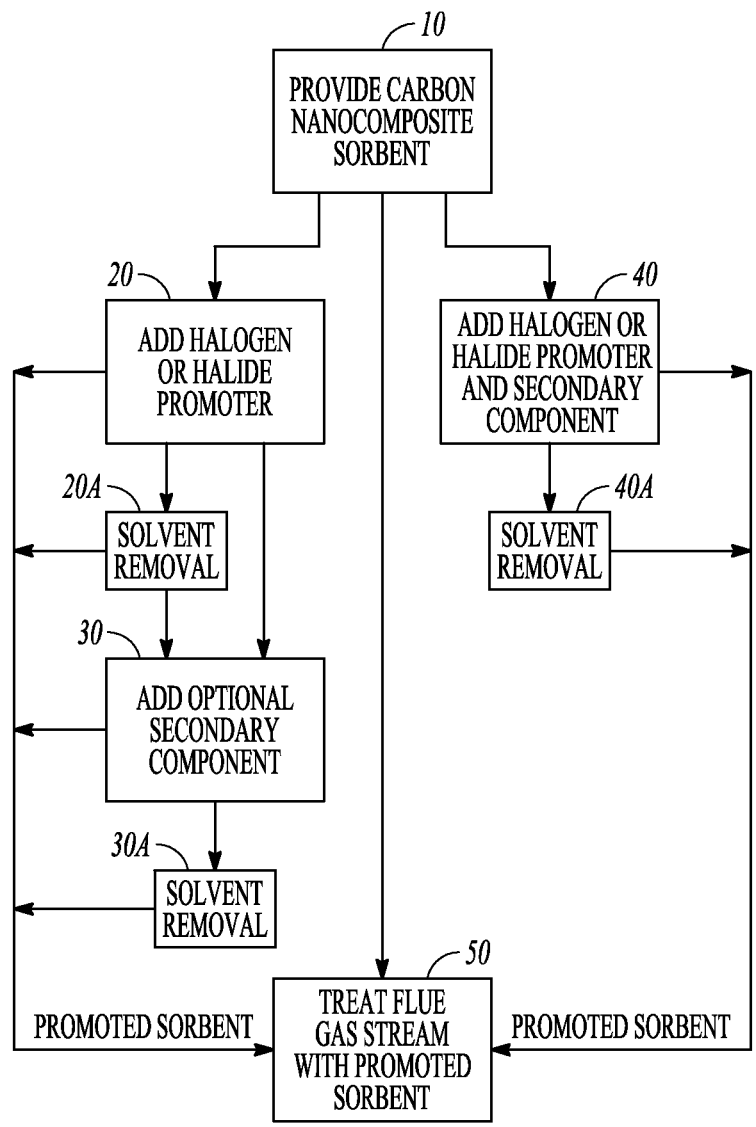
FIG. 1 schematically illustrates methods for preparation of promoted carbon sorbents, in accordance with various embodiments.

Reference will now be made in detail to certain claims of the disclosed subject matter, examples of which are illustrated in the accompanying drawings. While the disclosed subject matter will be described in conjunction with the enumerated claims, it will be understood that they are not intended to limit the disclosed subject matter to those claims. On the contrary, the disclosed subject matter is intended to cover all alternatives, modifications, and equivalents, which can be included within the scope of the presently disclosed subject matter as defined by the claims.

References in the specification to "one embodiment," "an embodiment," "an example embodiment," etc., indicate that the embodiment described can include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a concentration range of "about 0.1% to about 5%" should be interpreted to include not only the explicitly recited concentration of about 0.1 wt % to about 5 wt %, but also the individual concentrations (e.g., 1%, 2%, 3%, and 4%) and the sub-ranges (e.g., 0.1% to 0.5%, 1.1% to 2.2%, 3.3% to 4.4%) within the indicated range.

In this document, the terms "a," "an," or "the" are used to include one or more than one unless the context clearly dictates otherwise. The term "or" is used to refer to a nonexclusive "or" unless otherwise indicated. In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference should be considered supplementary to that of this document; for irreconcilable inconsistencies, the usage in this document controls.

In the methods of manufacturing described herein, the steps can be carried out in any order without departing from the principles of the invention, except when a temporal or operational sequence is explicitly recited.

Furthermore, specified steps can be carried out concurrently unless explicit claim language recites that they be carried out separately. For example, a claimed step of doing X and a claimed step of doing Y can be conducted simultaneously within a single operation, and the resulting process will fall within the literal scope of the claimed process.

Definitions

The term "about" can allow for a degree of variability in a value or range, for example, within 10%, within 5%, or within 1% of a stated value or of a stated limit of a range. When a range or a list of sequential values is given, unless otherwise specified, any value within the range or any value between the given sequential values is also disclosed.

The term "hydrocarbon" as used herein refers to a functional group or molecule that includes carbon and hydrogen atoms. The term can also refer to a functional group or molecule that normally includes both carbon and hydrogen atoms but wherein all the hydrogen atoms are substituted with other functional groups.

The term "pore" as used herein refers to a depression, slit, or hole of any size or shape in a solid object. A pore can run all the way through an object or partially through the object. A pore can intersect other pores.

The term "solvent" as used herein refers to a liquid that can dissolve a solid, liquid, or gas. Nonlimiting examples of solvents are silicones, organic compounds, water, alcohols, ionic liquids, and supercritical fluids.

The term "air" as used herein refers to a mixture of gases with a composition approximately identical to the native composition of gases taken from the atmosphere, generally at ground level. In some examples, air is taken from the ambient surroundings. Air has a composition that includes approximately 78% nitrogen, 21% oxygen, 1% argon, and 0.04% carbon dioxide, as well as small amounts of other gases.

The term "room temperature" as used herein refers to ambient temperature, which can be, for example, between about 15° C. and about 28° C.

As used herein, "substantially" refers to a majority of, or mostly, as in at least about 50%, 60%, 70%, 80%, 90%, 95%, 96%, 97%, 98%, 99%, 99.5%, 99.9%, 99.99%, or at least about 99.999% or more.

As used herein, "nanocomposite" refers to a multiphase solid material in which one of the phases has at least one dimension of less than about 1000 nm or in which less than an about 1000 nm repeat distance separates at least some of the phases that make up the material. In some embodiments, one of the phases has at least one dimension in the range of about 1 nm-1000 nm or in which an about 1-1000 nm repeat distance separates at least some of the phases that make up the material; in other embodiments, the lower limit of the range can be less than about 1 nm.

As used herein, "phase" refers to a region of space throughout which all physical properties of a material are essentially uniform, such as physical state, structure, and chemistry. For example, a liquid and a gaseous state can be two different phases. For example, a carbon material distributed on a substrate can be two different phases. For example, a carbon material distributed on a porous substrate can be two different phases.

As used herein, "mineral" refers to a naturally occurring solid chemical substance formed through biogeochemical processes, having, for example, characteristic chemical composition, highly ordered atomic structure, and specific physical properties.

Description

Various embodiments of the present invention provide methods and materials for the separation of a material from a gas. In some embodiments, the material can be a pollutant or an undesired constituent. In other embodiments, the material can be any suitable material. The gas includes the material; for example, the material can be dissolved or suspended in the gas. The material includes a carbon nanocomposite sorbent. The method includes providing or obtaining the carbon nanocomposite sorbent. The method includes contacting at least some of the material in the gas with the sorbent to form a material-sorbent composition. The method also includes separating particulates from the gas. The particulates include at least some of the material-sorbent composition. The separating gives a separated gas having a lower amount of the material therein than the starting material gas. Herein many specific examples of embodiments are given wherein the material separated is mercury, wherein the carbon nanocomposite sorbent is treated (e.g., promoted) with halides or halogens, or wherein the carbon nanocomposite sorbent is treated with other materials. However, one of ordinary skill in the art will extrapolate from the examples and appreciate that embodiments encompass separation of any suitable material (such as, for example, any suitable pollutant, e.g., arsenic, selenium, and the like) from a gas using any suitable carbon nanocomposite material.

In various embodiments, the material separated from the gas is a pollutant (e.g., an unwanted or undesirable constituent), and the material is desired to be removed from the gas to purify the gas. The pollutant can include mercury. The pollutant can include elemental mercury. The pollutant can include oxidized mercury. In various embodiments, the method can include providing a promoter. The promoter can be allowed to chemically react with at least a portion of the sorbent material, forming a promoted sorbent. The sorbent that contacts the pollutant can include the promoted sorbent. In various embodiments, the promoter can be a halogen or halide promoter.

Reducing the Mercury Content of a Mercury-Containing Gas

In various embodiments, the present invention provides methods and materials for reducing the mercury content of a mercury-containing gas. The method includes providing or obtaining a carbon nanocomposite sorbent. The method can include providing or obtaining a halogen or halide promoter. The method can include promoting at least a portion of the sorbent material by chemically reacting the portion of the sorbent material with the halogen or halide promoter to form a promoted sorbent. The method includes contacting at least part of the promoted sorbent with the mercury to form a mercury-sorbent composition. In various embodiments, the sorbent contacted with the mercury can also include unpromoted sorbent. The method also includes separating at least some of the mercury-sorbent composition from the mercury-containing gas. The separation gives a cleaned gas having a lower mercury content than the starting material gas. The mercury in the mercury-containing gas can be any suitable form of mercury, such as, for example, elemental mercury. The mercury can be suspended or dissolved in the gas. In some embodiments, the promoter can be HBr or $NH_4Br$, and in some examples, the HBr can be provided via degradation or reaction of ammonium bromide, $NH_4Br$. In some embodiments, the promoter (e.g., HBr) or promoter precursor (e.g., $NH_4Br$) can be injected at an injection rate in the flue gas separately from the carbon nanocomposite sorbent or with the carbon nanocomposite sorbent (e.g., can be applied to the sorbent pre-injection).

Carbon Nanocomposite Sorbent

The methods provided by embodiments of the present invention use a carbon nanocomposite sorbent to remove a material from a gas, for example, to remove mercury from a mercury-containing gas. Nanocomposites are composed of two of more phases such that the phases are intimately connected to each other at nanoscale dimensions (e.g., 1000 nm or less). When these nanocomposites are highly porous, especially microporous or nanoporous, the intimate connectivity of the two nanocomposites can result in high surface-areas as well as correspondingly high catalytic activities. This can especially be the case when a catalytically active material, such as certain forms of carbon, is dispersed on a bulk substrate having a high surface-area. Carbon nanocomposites can include a thin layer of graphene sheet coated on or intercalated into an inorganic support.

In some embodiments, the carbon nanocomposite sorbent can be about 50% or less carbon, or about 3 wt % to about 50 wt % carbon, or about 5 wt % to about 10 wt % carbon. In some embodiments, the carbon nanocomposite sorbent can be about 1 wt % to about 99.5 wt % bulk substrate, or about 50 wt % to about 97 wt % bulk substrate, or about 90 wt % to about 95 wt % bulk substrate (e.g., diatomaceous earth, smectite clays, and the like).

The nanocomposite of the present invention can be any suitable carbon nanocomposite. In some examples, the nanocomposite can be a suitable form of carbon distributed on a suitably porous or suitably high surface-area substrate. The nanocomposite can be produced or can be commercially obtained. In some embodiments, the nanocomposite is commercially obtained, and further processing steps may be required to suitably activate the carbon for separation of the material, such as separation of the mercury. Further processing steps to suitably activate the nanocomposite can include treatment with heat (e.g., calcining), treatment with base, treatment with a halide or halogen (e.g., promoting), or combinations thereof. For example, in some embodiments, treatment of the nanocomposite with a halide or halogen can promote the nanocomposite to form active sites in the nanocomposite which can transform mercury from elemental mercury into oxidized mercury (e.g., mercury oxide). In some embodiments, no promotion of the nanocomposite is used. For example, in some embodiments, treatment of the nanocomposite with an acid or base can prepare the nanocomposite for promotion using a halide or halogen or can prepare the nanocomposite such that suitable reactivity is obtained. In other embodiments, no treatment with acid or base is used prior to promotion using a halide or halogen or prior to using the sorbent to remove mercury or other materials from the gas.

The method can include contacting at least part of the nanocomposite sorbent with the material in the gas, such as mercury, to form a composition, such as a mercury-sorbent composition. The present invention is not dependent on any particular mechanism of action; so long as the material is removed from the gas using the carbon nanocomposite sorbent, the method is encompassed as an embodiment of the present invention. In some embodiments, the mercury is absorbed in its elemental form by the sorbent; the mercury-sorbent composition can include the sorbent and the elemental form of mercury. In some embodiments, the mercury is converted by the sorbent via a chemical reaction, such as oxidation, such that the mercury from the gas is transformed into an oxide of mercury (e.g., HgO); the mercury-sorbent composition can include the sorbent and a transformed form of the mercury such as a mercury oxide. In some embodiments, the mercury-sorbent composition can include a combination of elemental mercury and transformed mercury, such as mercury oxide. In some examples, the absorbing of elemental mercury or the transformation of mercury can modify the sorbent, such that the sorbent is at least slightly different after the composition is formed; e.g., after transformation of a particular atom of mercury to mercury oxide, the active location of the sorbent that caused the transformation can be unreactive or less reactive.

In some examples, elemental mercury or transformed mercury can remain absorbed to the sorbent until the mercury-sorbent composition has been removed in a later separation step. For example, elemental mercury or transformed mercury can be absorbed, or reacted and absorbed, into or onto the sorbent composition, such that at least about 1 wt %, 3 wt %, 5 wt %, 10 wt %, 20 wt %, 30 wt %, 40 wt %, 50 wt %, 60 wt %, 70 wt %, 80 wt %, 90 wt %, 95 wt %, 96 wt %, 97 wt %, 98 wt %, 99 wt %, 99.9 wt %, 99.99 wt %, or about 99.999 wt % or more of the mercury in the mercury-containing gas stream is absorbed, or reacted and absorbed, into or onto the sorbent composition. In some embodiments, elemental mercury or transformed mercury can be released from the mercury-sorbent composition; for example, less than about 1 wt %, 3 wt %, 5 wt %, 10 wt %, 20 wt %, 30 wt %, 40 wt %, 50 wt %, 60 wt %, 70 wt %, 80 wt %, 90 wt %, 95 wt %, or less than about 99 wt % of the mercury can be released from the mercury-sorbent composition prior to separation of the mercury-sorbent composition from the gas. In some examples, the majority of absorbed elemental or transformed mercury can remain part of the mercury-sorbent composition until the mercury-sorbent composition is removed in a later separation step. In some examples, transformed mercury that is released from the mercury-sorbent composition can be later removed from the gas via the separation step. In some examples, elemental or transformed mercury that has been released from the mercury-sorbent composition can contact carbon nanocomposite sorbent to form a mercury-sorbent composition, to be removed later via the separation step.

In various embodiments, the carbon nanocomposite sorbent includes binding sites that bind with mercury in the mercury-containing gas. In some examples, the sorbent material includes carbon that is reacted or impregnated with halogens or halides to form mercury binding sites in the promoted sorbent. In some examples, the sorbent material can include carbon that is activated at least in part by treatment with a base, wherein the base-activated carbon can react or become impregnated with halogens, hydrogen halides, and Group V or VI halides to form mercury-binding sites in the promoted sorbent. In some examples, the biding sites in the carbon react with mercury in the mercury-containing gas to form the mercury-sorbent composition. In some examples, at least a portion of the binding sites of the carbon react with oxidized mercury in the mercury-containing gas to form a mercury-sorbent composition.

In some embodiments, at least some of the carbon in the carbon nanocomposite is in the graphene form of carbon. The graphene form of carbon can, in some embodiments, include higher concentrations of locations suitable as the active sites of the nanocomposite. In some examples, certain parts of graphene carbon can have the highest concentrations of locations suitable as the active sites of the nanocomposite: in some examples at the edges, in some examples in non-edge locations. Such locations suitable as active sites may be activated via treatment with halide or halogen, as described herein. In various embodiments, the carbon in the carbon nanocomposite can be at least about 1 wt %, 2 wt %, 3 wt %, 4 wt %, 5 wt %, 10 wt %, 20 wt %, 30 wt %, 40 wt %, 50 wt %, 60 wt %, 70 wt %, 80 wt %, 90 wt %, 95 wt %, 96 wt %, 97 wt %, 98 wt %, 99 wt %, 99.9 wt %, 99.99 wt %, or more than about 99.999 wt % graphene form of carbon.

In some embodiments, the carbon nanocomposite sorbent has a mean particle diameter greater than 40 micrometers, or greater than 60 micrometers, or a particle size distribution greater than that of fly ash or entrained ash in a flue gas stream to be treated, such that the carbon nanocomposite sorbent and ash can be separated by physical means in the separation step.

In one example, the nanocomposite can be a carbon nanocomposite that is promoted for gas-phase Hg oxidation when a halide salt contained in the porous structure is decomposed during injection into a heated duct. In some examples, the halide salt can be ammonium bromide. In some examples, the carbon nanocomposite can include graphene. In some examples, the non-carbon part of the nanocomposite includes a high surface-area, porous, inorganic matrix.

Method of Forming a Carbon Nanocomposite Sorbent

The carbon nanocomposite sorbent can be obtained, it can be synthesized, or any combination thereof. For example, an obtained carbon nanocomposite material may need further treatment before it is suitable for use in an embodiment of the method of the present invention. Various embodiments provide a method of forming the carbon nanocomposite sorbent, a carbon nanocomposite sorbent formed thereby, or a combination of the carbon nanocomposite sorbent with a mercury-containing gas. For example, the method of making the carbon nanocomposite sorbent can include providing or obtaining a carbon precursor, wherein the carbon precursor provides the carbon in the carbon nanocomposite sorbent. The method can include providing or obtaining a substrate material, wherein the substrate material provides the bulk substrate in the carbon nanocomposite sorbent. The method can include contacting the carbon precursor and the substrate material to provide a nanocomposite starting material. The method can include heating the nanocomposite starting material. Heating the nanocomposite starting material provides the nanocomposite sorbent. Before use, the nanocomposite sorbent can optionally be subjected to processing steps, such as treatment with base, or such as treatment with a halogen or halide, which can allow formation of active sites on the carbon nanocomposite that can react with elemental mercury to transform the mercury, for example, into oxidized mercury (e.g., mercury oxide).

In some examples, using a substrate such as a clay (e.g., the substrate allowing for an open and porous substructure), a carbohydrate (e.g., carbon precursor) can be contacted with the substrate. The resulting mixture can be heated, which creates a carbon layer with a low carbon density that covers the open porous structure of the substrate material. In some embodiments, as the mixture is heated, the substrate can swell. The carbon layer can be created by chemical reactions of the carbon precursor caused by the heating step, including decomposition reactions, including for example pyrolysis, dehydration, or decarboxylation reactions. In some embodiments, the carbon layer created includes the graphene form of carbon, for example as graphene ribbons. The graphene form of carbon, especially at its edges, can, in some embodiments, include higher concentrations of locations suitable as the active sites of the nanocomposite. The carbon coats the surfaces of the clay particles, which can be randomly stacked in a highly porous matrix. In examples, a halide or halogen can be introduced to the sorbent, promoting the carbon and enhancing the reactivity of the sorbent to mercury. The halide or halogen can be introduced in various forms.

In some embodiments, a promoted sorbent can be produced "in-flight." This can be accomplished by, for example, contacting the vapors of any combination of halogens, in-flight, with the carbon nanocomposite sorbent. In-flight promotion of the carbon nanocomposite sorbent can be accomplished by contacting the vapors of any combination of halogens with the carbon nanocomposite sorbent in a stream of transport air or a polluted gas stream containing mercury from which mercury is to be removed. The particles can be dispersed in a stream of transport air (or other gas), which also conveys the halogen-/halide-promoted carbon sorbent particles to the flue gas duct, or other polluted gas stream, from which mercury is to then be removed. In some embodiments, the particles can be dispersed directly in a flue gas stream.

The simplicity and resulting cost savings of in-flight promotion can be advantageous. Capital equipment costs, operation costs, and transportation costs of a treatment facility can be eliminated. In-flight preparation can use existing hardware and operation procedures and can help to ensure the promoted sorbent is always fresh and, thus, more reactive. In-flight preparation allows for rapid on-site tailoring of the degree of promoting the sorbent in order to ensure adequate reactivity to match the requirements of flue gas changes, such as may be needed when changing fuels or reducing loads, thus further optimizing the economics and effectiveness of mercury capture.

Carbon Precursor

The method of making the carbon nanocomposite sorbent can include providing or obtaining a carbon precursor, wherein the carbon precursor provides the carbon in the carbon nanocomposite sorbent. The carbon layer in the nanocomposite can be created by chemical reactions of the carbon precursor caused by the heating step, including decomposition reactions, including for example pyrolysis, dehydration, or decarboxylation reactions.

The carbon precursor can include any suitable carbon precursor, such that the heating step transforms the carbon precursor and the substrate into a suitable carbon nanocomposite sorbent. For example, the carbon precursor can be any sugar source such as a carbohydrate (saccharide), including, for example, brown sugar, barley sugar, caramel, cane sugar, corn syrup, molasses, sugar or sugar processing wastes such as beet sugar waste, cane sugar waste, and the like. The carbon precursor can be any suitable starch or source of starch.

In some examples, the carbon precursor can be present in from about 1 wt % to about 99 wt %, about 20 wt % to about 80 wt %, or about 40 wt % to about 60 wt % of the starting material for the carbon nanocomposite sorbent. In some examples, the carbon precursor can be present in from about 50% or less carbon, or about 3 wt % to about 50 wt % carbon, or about 5 wt % to about 10 wt % carbon of the starting material for the carbon nanocomposite sorbent. Wt % in this paragraph refers to the percentage by weight based on the total weight of the carbon precursor and the substrate material.

Substrate Material

The method of making the carbon nanocomposite sorbent can include providing or obtaining a substrate material, wherein the substrate material provides the bulk substrate in the carbon nanocomposite sorbent.

The substrate material can include any suitable substrate material, such that the heating step transforms the carbon precursor and the substrate material into a suitable carbon nanocomposite sorbent. The substrate can include any suitable porous material. For example, the substrate material can be diatomaceous earth, zeolites, porous minerals (e.g., clays) including, for example, smectites (e.g., montmorillonite, bentonite, nontronite, saponite), kaolins, illites, chlorites, sepiolite, or attapulgites. In some examples, the substrate can include polymers, non-metals, metals, metalloids, ceramics or mixtures, and blends, as well as composites and alloys thereof. The materials can be synthetic or naturally occurring or naturally derived materials. Examples of synthetic polymers include any common thermoplastics and thermosetting materials. Examples of metals include aluminum, titanium, copper, steel, and stainless steel. Examples of ceramics include any form of alumina, zirconia, titania, and silica. Examples of naturally occurring or naturally derived materials include wood, wood composites, paper, cellulose acetate, and geologic formations such as granite or limestone. Examples of non-metals include various forms of carbon such as graphite or carbon. Examples of metalloids include silicon or germanium. The porous material can be a construction material such as concrete or asphalt.

In some examples, the substrate material can be present in from about 1 wt % to about 99 wt %, about 20 wt % to about 80 wt %, or about 40 wt % to about 60 wt % of the starting material for the carbon nanocomposite sorbent. Wt % in this paragraph refers to the percentage by weight based on the total weight of the carbon precursor and the substrate material.

Contacting and Heating

The method of making the carbon nanocomposite sorbent can include contacting the carbon precursor and the substrate material to provide a nanocomposite starting material. The method can include heating (e.g., providing energy to) the nanocomposite starting material. Heating (or other means of providing energy to) the nanocomposite starting material provides the nanocomposite sorbent.

The contacting can take place in any suitable fashion. The contacting mixes the carbon precursor and the substrate material, such that when the conglomeration is heated (or subjected to any other suitable source of energy), the carbon nanocomposite sorbent is formed. The contacting can be performed such that the carbohydrate is approximately evenly distributed on the substrate. In some examples, water or another solvent can be added to help distribute the carbon precursor on the substrate. In examples where water is included in the mixture of the carbon precursor and the substrate, the conglomeration can be dried prior to the heating. The drying can occur in any conventional manner (e.g., convective, conductive, microwave, and the like), including by heating near or above the boiling point of the solvent, in the case of water (e.g., 50° C.-120° C. or higher), at atmospheric pressure, under pressure, or under a vacuum.

The contacted composition of the carbon precursor and the substrate can then be heated to form the carbon nanocomposite sorbent. The heating is sufficient to cause the chemical reactions that transform the carbon precursor into the form of carbon present in the carbon nanocomposite (e.g., decomposition reactions) including, for example, pyrolysis, dehydration, or decarboxylation reactions. The heating can take place at any suitable temperature, such that the carbon nanocomposite is sufficiently formed, for example about 50° C., 100° C., 200° C., 300° C., 400° C., 500° C., 600° C., 700° C., 800° C., 900° C., 1000° C., 1100° C., or about 1200° C. The heating can take place for any suitable time, such that the carbon nanocomposite is sufficiently formed, for example, greater than about 1 min, 2 min, 5 min, 10 min, 30 min, 1 h, 1.5 h, 2 h, 3 h, 4 h, 5 h, 10 h, or greater than about 24 h. The heating can take place in any suitable apparatus, for example, a unit that allows heated air to flow around the mixture being heated or a furnace. The heating can be accelerated, or lengthened, depending on the apparatus and the nanocomposite material.

Halogen or Halide Promoter

A "halogen" is defined as a member of the elements included in Group VIIA of the periodic table (Group VIIA [CAS] corresponds to Group VIIB [IUPAC]). The molecular elemental form of the halogens, including $F_2$, $Cl_2$, $Br_2$, and $I_2$, can be relatively uncreative with elemental mercury in a hot flue gas. Any halogen ion, gas, or compound can be a promoter.

Embodiments of the method for reducing the mercury content of a mercury-containing gas include providing or obtaining a halogen or halide promoter. The method includes promoting at least a portion of the sorbent material. The promoting of the sorbent material includes chemically reacting or impregnating the portion of the sorbent material with the halogen or halide promoter. The halogen or halide promoter can be derived from reaction or degradation of another compound (e.g., a promoter precursor). The promoting of the sorbent material gives a promoted sorbent. The promoting of the sorbent material can occur before injection into a gas stream, during injection into a gas stream, after injection into a gas stream, or a combination thereof, wherein the gas stream can be a mercury-containing gas stream, a transport stream, or a combination thereof. In some examples, the promoter can be added to the sorbent before the promoter and the sorbent react, such that the heat of the gas stream into which the promoter is added causes the promoting of the sorbent. For example, the promoter can be added as a gas, as a gas dissolved in a liquid, or as a solid such as a salt, or other substance (e.g., acid) dissolved in liquid (e.g., water). In examples wherein the promoter is added in a liquid such as water, the water can be allowed to dry, which can allow the promoter to adhere to, impregnate, or react with the nanocomposite sorbent, or a combination thereof. In some examples, a pre-added promoter can be an ammonium salt, such as an ammonium chloride, an ammonium bromide, or an ammonium iodide, including, for example, mono-, di-, tri-, or tetraalkyl ammonium halides, or $NH_4^+$ halide salts. In some examples, the promoter can be added to the sorbent near to or at the time of promoting; for example, the promoter can be added to a gas stream with the sorbent or such that it contacts the sorbent within a heated gas stream, such as a mercury-containing gas stream or a feed gas stream. In some examples, the promoter can be $NH_4Br$.

In some embodiments, the promoter can be HBr, and in some examples, the HBr can be provided via degradation or reaction of a promoter precursor such as ammonium bromide, sodium bromide, or calcium bromide. The promoter can be HCl, and in some examples, the HCl can be provided via degradation or reaction of a promoter precursor such as ammonium chloride, sodium chloride, or calcium chloride. The promoter can be HF, and in some examples, the HF can be provided via degradation or reaction of a promoter precursor such as ammonium fluoride, sodium fluoride, or calcium fluoride. In some examples, the promoter (e.g., HBr or HCl) or promoter precursor (e.g., $NH_4Br$, NaBr, $CaBr_2$, $NH_4Cl$, NaCl, $CaCl_2$) can be injected in the flue gas separately from the carbon nanocomposite sorbent or with the carbon nanocomposite sorbent (e.g., can be applied to the sorbent pre-injection, injected simultaneously at the same location, or injected simultaneously at different locations).

Not intending to limit embodiments to any particular mechanism of action, in various embodiments, adding a halogen, or a proton from a hydrogen halide acid, to a basic carbene site on the carbon edge structure forms a carbocation that accepts electrons from the neutral mercury atom forming the oxidized mercury species that is bound to the sorbent surface. The reactive site can also generate reactive halogen radicals or carbon radicals at the active sites on the carbon. Thus the carbon nanocomposite sorbent provides a highly reactive halogen-containing reagent that can oxidize the mercury and promote its capture on the carbon nanocomposite sorbent. In some embodiments, a sorbent that contains bromine or that is promoted by bromine or a bromine reagent is expected to be more reactive than the corresponding sorbent promoted by chlorine or a chlorine reagent and less expensive than the sorbent promoted by iodine or an iodine reagent.

Reactions of halogens and acidic species with the binding sites on the promoted carbon nanocomposite sorbent can create active sites for oxidizing mercury. Other metal ions, such as boron, tin, arsenic, gallium, Sb, Pb, Bi, Cd, Ag, Cu, Zn, Se, or other pollutants, can also react with the oxidation sites on the carbon.

In some embodiments, the halogen or halide promoter that is added to, and reacts with, the carbon nanocomposite sorbent can include, by way of illustration and not limitation, a molecular halogen in vapor or gaseous form, a molecular halogen in an organic solvent, a Group V or Group VI halide, such as $PBr_3$ or $SCl_2$, respectively, in vapor, liquid, or solution form (e.g., in water or a non-aqueous solvent such as an alcohol or other organic solvent).

Embodiments are also provided in which the organic solvent can include a chlorinated hydrocarbon, such as dichloromethane, a hydrocarbon solvent, including for example, petroleum ether, ligroin, pentane, hexane, toluene, and benzene, carbon disulfide, a waste solvent, an ether, a recycled solvent, a supercritical solvent, such as supercritical $CO_2$, water (though not in the case of a Group V or Group VI halide), and others as will be apparent to those of skill in the art.

In some embodiments, the method can include adding an additional halogen or halide promoter to the promoted sorbent. The additional halogen or halide can be any halogen or halide described herein as suitable as the first halogen or halide. For example, the additional halogen or halide promoter can include HI, HBr, HCl, a Group V element with halogen, or a Group VI element with halogen.

In various embodiments, the step of promoting at least a portion of the sorbent material can occur at least partially before the contacting of the mercury-containing gas with the sorbent. In some examples, the step of promoting at least a portion of the sorbent can occur at least partially during the contacting of the mercury-containing gas with the sorbent. In some examples, the carbon nanocomposite sorbent can be injected into a gas stream at an injection rate, in which at least one promoter is injected separately at an injection rate into a gas stream whereby in-flight reaction produces the promoted sorbent. In some examples, the promoter can be reacted in the gas phase or as a vapor. In some examples, the promoter is added at from about 0.01 g to about 200 g, or about 0.1 g to about 100 g, or about 1 g to about 30 g per 100 grams of carbon nanocomposite sorbent material. In some examples, either one or both of the gas streams into which the sorbent and the promoter are injected can be a transport gas, a flue gas stream (e.g., a mercury-containing gas), or a combination thereof. In some examples, the promoter injection rate and the sorbent injection rate into the gas are determined, at least in part, from the monitored mercury content of the cleaned gas.

Contacting the Sorbent and the Mercury in the Mercury-Containing Gas

In embodiments of the method for reducing the mercury content of a mercury-containing gas, the method can include contacting at least part of the promoted sorbent with the mercury in the mercury-containing gas. Contacting the promoted sorbent with the mercury in the mercury-containing gas includes contacting the promoted sorbent with the mercury-containing gas. Contacting the promoted sorbent with the mercury forms a mercury-sorbent composition. The contacting can occur in any suitable location. For example, the contacting can occur in the gas. In another embodiment, the contacting can occur in an aqueous liquid. In another example, the contacting can occur in the gas, and subsequently contacting can also occur in an aqueous phase such as a scrubber.

In various embodiments, measurement of mercury emissions can be used as feedback to assist in controlling the sorbent injection rate. Tighter control on the sorbent and optional component(s) levels can be achieved in this way, which can help to ensure mercury removal requirements are met with the minimum promoter and sorbent requirements, thus minimizing the associated costs. In an embodiment, the mercury emissions are continuously measured downstream of the injection location, for example, in the exhaust gas at the stack. In various embodiments, contacting at least part of the promoted sorbent with the mercury in the mercury-containing gas can occur between particulate control devices.

Separating at Least Some of the Mercury-Sorbent Composition from the Mercury-Containing Gas In embodiments of the method for reducing the mercury content of a mercury-containing gas, the method includes separating at least some of the mercury-sorbent composition from the gas. The separation gives a cleaned gas, having a lower mercury content than starting material mercury-containing gas. In some embodiments, separating at least some of the mercury-sorbent composition from the mercury-containing gas comprises separating particulates from the gas, wherein the particulates comprise at least some of the mercury-sorbent composition.

In some examples, the step of separating particulates from the mercury-containing gas includes separating the particulates from the gas in a particulate separator. The particulate separator can be any suitable separator. The particulate separator can include one or more cyclones, electrostatic precipitators, fabric separators, scrubbers, or other particulate removal devices as are known in the art. In some embodiments, an electrostatic precipitator can be used, followed by a scrubber. In other embodiments, an electrostatic precipitator can be used without a scrubber, or another particulate separator can be used. Some devices that can function as particulate separators can also have other functions, for example a scrubber can also remove $SO_2$ or $SO_3$ from the gas stream, as described further below. In embodiments that include contacting of the mercury with a sorbent in an aqueous phase, e.g. in a scrubber, the removal of mercury from the gas that occurs within the aqueous phase by reaction or interaction of the mercury with the sorbent in the aqueous phase can be considered separation of the mercury-sorbent composition from the gas.

In some examples, by separating the particulates from the mercury-containing gas, at least about 20 wt %, 30 wt %, 40 wt %, 50 wt %, 60 wt %, 70 wt %, 80 wt %, 90 wt %, 95 wt %, 96 wt %, 97 wt %, 98 wt %, 99 wt %, 99.9 wt %, 99.99 wt %, or about 99.999 wt % or more mercury can be removed from the mercury-containing gas stream. As discussed herein, the mercury can be removed in the form of elemental mercury, in the form of a transformed mercury, such as a oxidized mercury (e.g., mercury oxide).

Scrubber

In various embodiments of the method for reducing the pollutant content of a pollutant-containing gas, an aqueous scrubber can be used. An aqueous scrubber allows an aqueous liquid or aqueous slurry to contact the gas stream. A scrubber can spray, nebulize, or otherwise distribute aqueous material in the space through which the gas stream flows therein such that the surface area of the liquid that contacts the gas in the scrubber is increased. The aqueous solution can fall to the bottom of the scrubber, where it can be recycled back to the top, or removed to be regenerated, cleaned, or replaced. The aqueous scrubber can be any suitable aqueous scrubber. In some examples, the aqueous scrubber can remove one or more pollutants from the gas stream.

A scrubber can remove particulate from a gas stream. For example, when a gas stream including particulates passes through the scrubber, particulates that contact droplets or other forms of aqueous solution can become stuck or immersed in the aqueous solution. As the aqueous solution falls to the bottom of the scrubber, the particles can fall with it. The aqueous solution can be recycled back to the top of the scrubber with at least some of the particles in it. The aqueous solution can be any suitable consistency, such as a free-flowing clear liquid, a liquid having suspended solid, or slurry of any suitable viscosity. Continuously or batchwise the aqueous solution in the scrubber can be cleaned or replaced, removing, for example, particles, pollutant, or pollutant-byproduct. In one example, sorbent in the aqueous solution can be separated and regenerated, such as described in US 2007/0167309.

In various embodiments, the method can include removing at least some $SO_2$ or $SO_3$ from the pollutant-containing gas (e.g. reducing the concentration of $SO_2$ or $SO_3$). The removal can be done in any suitable way. In some examples, an aqueous scrubber can remove $SO_2$ or $SO_3$ from the gas stream, for example, by reaction with $SO_2$ or $SO_3$ with chemical compounds present in the water in the scrubber. Some examples of chemical compounds that can be included in the water in the scrubber that can react with $SO_2$ or $SO_3$ include salts that form basic solutions in water, such as, for example, carbonate ($CO_3^{-2}$), bicarbonate ($HCO_3^-$), or carbamate ($OCONH_2^-$) salts, having any suitable counterion, such as, for example, ammonium ($NH_4^+$) sodium ($Na^+$), potassium ($K^+$), magnesium ($Mg^{+2}$) or calcium ($Ca^{+2}$). For example, the basic salt can be ammonium carbonate (($NH_4$)$_2CO_3$), ammonium bicarbonate (($NH_4$)$HCO_3$), or ammonium carbamate (($NH_4$)$OCONH_2$).

In various embodiments, a promoter or promoter precursor can be in the aqueous solution of the scrubber. In some embodiments, a promoter (e.g., HBr) can be added directly to the water in the aqueous scrubber. In some examples, a promoter precursor (e.g., $NH_4Br$) can be added directly to the water in the aqueous scrubber, where it can decompose to form the promoter (e.g., HBr). The promoter precursor can be injected into hot gas (e.g., a hot carrier gas, or the flue gas stream) where it can be converted into the promoter, and subsequently the gas stream can enter the scrubber, where the precursor can be absorbed or dissolved in the water in the scrubber. The promoter or promoter precursor can enter any suitable part of the scrubber in any suitable way, for example, it can enter the flue gas stream prior to entering the scrubber, it can be separately injected into the gas phase of the scrubber, or it can be injected into the aqueous phase of the scrubber.

In some embodiments, the aqueous solution in the scrubber can include activated carbon nanocomposite sorbent. In such embodiments, the scrubber can remove one or more pollutants from the gas stream, such as mercury, by allowing the activated sorbent in the aqueous phase to react with or absorb one or more pollutants from the gas stream. The nanocomposite can enter the scrubber in any suitable location in any suitable way, for example, it can enter the flue gas stream prior to entering the scrubber, it can be separately injected into the gas phase of the scrubber, or it can be injected into the aqueous phase of the scrubber. Optionally, aqueous solutions that include activated carbon nanocomposite sorbent can include other chemicals that can react with pollutants in the gas stream, such that the scrubber can remove more than one type of pollutant. For example, in addition to activated carbon nanocomposite sorbent, an aqueous scrubber solution can also include basic salts that can react with $SO_2$.

In some examples, the carbon nanocomposite can be activated in the scrubber, such as in embodiments that include the promoter in the water of the scrubber. The carbon nanocomposite can be added directly to the scrubber (e.g. to the gas phase or liquid phase), or before the scrubber in the gas stream flowing into the scrubber. The carbon nanocomposite can be added at any suitable point between a particulate control device (e.g. ESP) and a scrubber. In some examples, both the carbon nanocomposite and the promoter or promoter precursor can be injected into a hot gas stream (e.g. hot carrier gas, or the flue gas stream) where promoted carbon nanocomposite sorbent can form prior to entry into the scrubber. In some embodiments, a carbon nanocomposite can be coated with a promoter or promoter precursor, and the coated carbon nanocomposite can be injected into a hot gas (e.g., a hot carrier gas, or the flue gas stream) where it can convert into the promoter, and subsequently be absorbed in the water in the scrubber.

In embodiments including an ESP and a scrubber, optionally carbon nanocomposite can be used for pollutant removal prior to an ESP and also in a wet scrubber. In such an embodiment, the ESP can remove nanocomposite-pollutant. Alternatively, the carbon nanocomposite can be used in the scrubber and not prior to the ESP. Alternatively, the carbon nanocomposite can be used only prior to the ESP and not in the scrubber or not predominantly in the ESP.

Alkaline Component

In some examples, the method of removing mercury from a mercury-containing gas stream can include injecting an alkaline (e.g., basic) component into the mercury-containing gas. In some examples, the alkaline component includes an oxide, hydroxide, carbonate, or phosphate of an alkali or alkaline-earth element.

In various examples, the addition of an alkaline component separately or with the carbon nanocomposite sorbent can result in improved mercury capture, in some examples exceeding that of both the promoted and unpromoted carbon nanocomposite sorbent. Various factors can impact the effectiveness of the alkaline addition, such as, for example, flue gas pollutants, flue gas constituents (e.g., $SO_2$, $NO_x$, HCl, and the like), operating temperature, mercury form, and mercury concentration. In some examples, the alkaline-to-activated-carbon ratio can be adjusted to optimize for a given set of site conditions.

Stabilizing Agent

In some examples, a stabilizing agent can be added to the promoted sorbent. The stabilizing agent can be a mercury stabilizing agent. In some embodiments, a method is provided whereby a mercury stabilizing agent is added to a promoted carbon sorbent to produce a bifunctional sorbent. Such stabilizing agent(s) can be sequentially added, either before or after the addition and reaction of the halogen/halide. In some embodiments, the halogen/halide includes Br or HBr, and the mercury-stabilizing agent can include S, Se, $H_2S$, $SO_2$, $H_2Se$, $SeO_2$, $CS_2$, $P_2S_5$, and combinations thereof.

Regeneration of Sorbent

In any of the embodiments of the method or the material for separating mercury from a mercury-containing gas stream, the carbon sorbent can be regenerated; sorbent-poisoning pollutants from the flue gas can be removed; and the sorbent can be re-promoted to restore mercury sorption activity. The regenerated sorbent can then be used again in the method. Detailed examples of sorbent regeneration techniques are described in co-pending, commonly owned PCT patent application No. PCT/US04/12828, titled "PROCESS FOR REGENERATING A SPENT SORBENT," which is hereby incorporated by reference in its entirety.

Example Process

In various embodiments, the carbon nanocomposite sorbent, method of mercury removal, and optional additives discussed herein have applicability to mercury control from the product or effluent gas or gases from gasification systems, syngas generators, and other mercury-containing gas streams, in addition to the flue gas from combustion systems. Thus, it should be understood that the terms combustion system and flue gas as used throughout this description can apply equally to gasification systems and syngas or fuel gas, as will be understood by those skilled in the art.

Referring now to FIG. 1, there is shown a block flow diagram illustrating methods for preparation of promoted carbon sorbents, in accordance with various embodiments. Block 10 illustrates providing carbon nanocomposite sorbent and adding a halogen or halide promoter that reacts with the carbon, illustrated at block 20, to produce a promoted carbon nanocomposite sorbent. In embodiments where a halogen or halide is added in, for example, a solvent, solvent removal can be used as illustrated by block 20A. Block 30 indicates adding an optional secondary component illustrated at block 30 that reacts with the result of block 20 or 20A to produce a promoted carbon nanocomposite sorbent. In embodiments where the halogen or halide promoter and/or secondary component are added in, for example, a solvent, solvent removal can be used as illustrated by block 30A.

In FIG. 1, the steps leading to step 50 produce promoted sorbent prior to treatment of the flue gas stream with the promoted sorbent. The addition of one or more promoters, and the reactions or interactions with the promoters that lead to promotion of the sorbent, can occur in any suitable location. In some examples, the sorbent can be promoted in a hot-gas stream, such as in a flue gas stream, or such as in a hot carrier gas stream. In some embodiments, the promoter can be added to the sorbent before the sorbent is injected into a hot-gas stream. In some embodiments, the promoter can be added to the hot-gas stream with the sorbent, referred to herein as "in-flight" promotion of the sorbent. Thus, in some embodiments, prior to step 50, the promoter and the sorbent can be injected together or separately into the flue gas stream or another hot-gas stream.

Referring still to FIG. 1, path 10-40 includes providing a carbon nanocomposite sorbent as illustrated at block 10 and adding a halogen or halide promoter and a secondary component to the sorbent together, with which they can react as illustrated by block 40, producing a promoted carbon nanocomposite sorbent. In embodiments where one or more components are added in solvent, a solvent removal step can be provided as illustrated by block 40A.

Referring still to FIG. 1, also illustrated are embodiments in which, as illustrated by block 50, a flue gas stream is treated with promoted carbon nanocomposite sorbent prepared as described herein.

Figure 2:
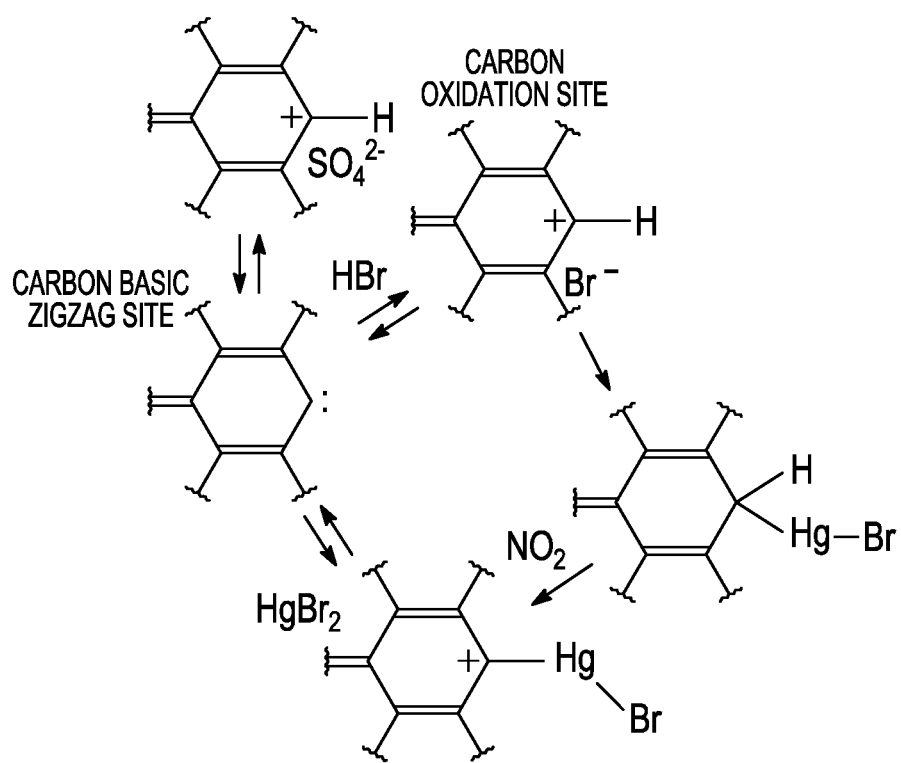
FIG. 2 illustrates a proposed mechanistic model of the chemical reactions resulting in the oxidation and capture of mercury, in accordance with various embodiments.

Referring now to FIG. 2, there is illustrated a theory developed from scientific evidence to explain the nature of the promoting compounds, which is not intended to limit embodiments of the present invention to any specific theory of operation. The method of the present invention encompasses any removal of mercury from a gas using a carbon nanocomposite in any suitable way.

For example, as illustrated in FIG. 2, hydrogen bromide can react with the unsaturated structure of the carbon nanocomposite sorbent. The hydrogen bromide can be provided by, for example, ammonium bromide. The reactive part of the carbon on the carbon nanocomposite sorbent can be, by way of illustration only, a carbene species on the edge of the graphene sheet structures of the carbon. Molecular bromine or other bromine compounds can react to form a similar structure, with a positive carbon that is active for oxidizing the mercury with subsequent capture by the sorbent.

The formation of the bromide compound with carbon increases the reactivity of the carbon nanocomposite toward mercury and other pollutants. Additionally, the resulting bromide compound is uniquely suited to facilitate oxidation of the mercury. The effectiveness of the oxidation may result from the promotion effect of the halide exerted on the developing positive charge on the mercury during the oxidation, known in the chemical arts as a specific catalytic effect. Thus, as the mercury electrons are drawn toward the positive carbon, the halide anion electrons can push in from the other side, stabilizing the positive charge developing on the mercury and lowering the energy requirement for the oxidation process. Bromide is especially reactive, owing to the highly polarizable electrons in the outer 4p orbitals of the ion. Thus, adding HBr or $Br_2$ to the carbon nanocomposite can form a similar carbon bromide, in which the positive carbon can oxidize the mercury with the assistance of the bromide ion.

Figure 3A:
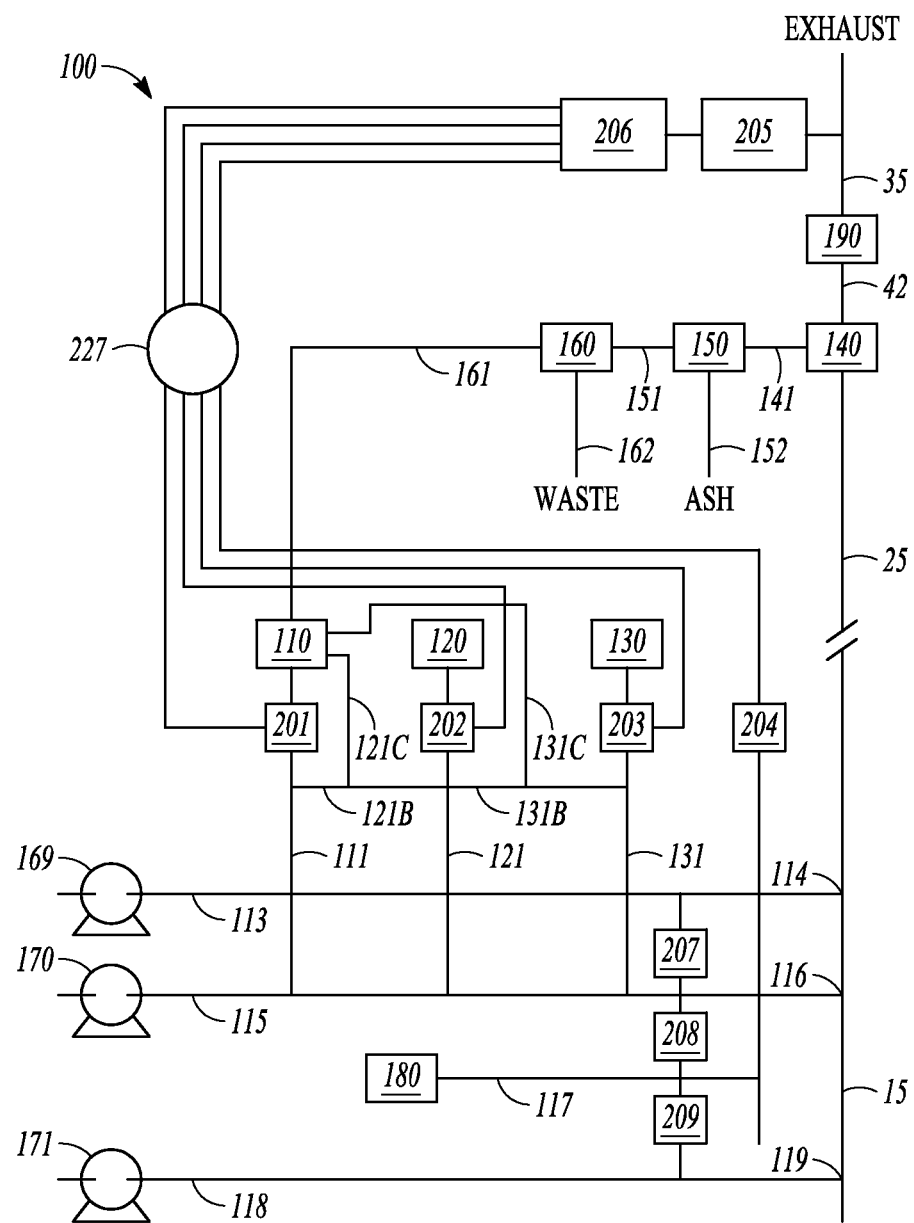
FIGS. 3A and 3B schematically illustrate preparation of promoted carbon sorbents and processes for flue gas mercury reduction in flue gases (e.g. from combustion) and/or product gases from a gasification system, in accordance with various embodiments.

FIG. 3A shows a schematic flow diagram of mercury control system 100 including preparation of promoted carbon sorbents and flue gas mercury reduction, in accordance with embodiments of the present invention. There is provided carbon nanocomposite sorbent reservoir 110, an optional halogen/halide promoter reservoir 120, an optional secondary component reservoir 130, and an optional alkali component reservoir 180, each of which with corresponding flow control device(s) 201, 202, 203, and 207/208/209, respectively. Reservoirs 110, 120, and 130 with corresponding flow controllers 201, 202, and 203 can be used in conjunction with transport lines 113 and 115 independently, together, or not at all. For example, reservoir 110 with controller 201 can be used with transport line 113 independently and separately to inject material at injection point 114, while at the same time, optional reservoirs 120 and/or 130 with corresponding flow controllers 202 and/or 203 can be used with transport line 115 to independently and separately inject material at injection point 116. In conjunction with the optional alkali component reservoir 180, optional flow control devices 207, 208, and 209 can be used independently, together, or not at all.

Reservoirs 110, 120, 130, and 180 connect through their respective flow control devices and via associated piping, to transport lines 113 and 115. Optional alkali component reservoir 180 can also connect, through respective flow control devices and via associated piping, to transport line 118. A source of air, nitrogen, or other transport gas(es) is provided by gas source 169 to transport line 113 to entrain materials discharged from reservoirs 110, 120, 130, and 180 and to inject such materials, via injection point 114, into polluted flue gas stream 15. A source of air, nitrogen, or other transport gas(es) is provided by gas source 170 to transport line 115 for the purpose of entraining materials discharged from reservoirs 110, 120, 130, and 180 and injecting such materials, via injection point 116, into polluted flue gas stream 15. A source of air, nitrogen, or other transport gas(es) can be provided by gas source 171 to transport line 118 for the purpose of entraining materials discharged from reservoirs 180 and injecting such materials, via injection point 119, into flue gas stream 15. Gas sources 169, 170, and 171 can be the same or different, as desired. Alternatively, transport gas(es) can be provided to transport lines 113, 115, and 118 by gas source 170 (connection from source 170 to transport line 113 and/or 118 not shown). Although gas sources 169, 170, and 171 are shown in FIG. 3A as compressors or blowers, any source of transport energy known in the art can be acceptable, as will be appreciated by those of ordinary skill in the art. For example, 169 can be a pump in the case that 120 is added as a liquid.

For clarity, single injection points 114, 116, and 119 are shown in FIG. 3A, although one of ordinary skill in the art will understand that multiple injection points are within the scope of the present invention. Optical density measuring device(s) 204 is connected to transport line 113 or 115 (or 118, not shown) to provide signals representative of the optical density inside transport line 113, 115, or 118 as a function of time.

Downstream from injection point 116 and 119 is provided particulate separator 140. By way of illustration and not limitation, particulate separator 140 can include one or more fabric filters, one or more electrostatic precipitators (hereinafter "ESP"), or other particulate removal devices as are known in the art. It should be further noted that more than one particulate separator 140 can exist, sequentially or in parallel, and that injection point 116 and 119 can be at a location upstream and/or downstream of 140 when parallel, sequential, or combinations thereof exist. Particulate separator 140 can produce at least a predominantly gaseous ("clean") stream 42 and a stream 141 including separated solid materials. A sorbent/ash separator 150 can separate stream 141 into a largely ash stream 152 and a largely sorbent stream 151. Alternatively, not shown, stream 141 can be disposed of as a waste stream or sent directly to the optional sorbent regenerator 160. Stream 151 can then be passed to an optional sorbent regenerator 160, which yields a regenerated sorbent stream 161 and a waste stream 162.

An optional aqueous scrubber 190 is provided after optional ESP 140. The aqueous scrubber 190 can be provided with ESP 140 or without ESP 140. Scrubber 190 can remove particulates from the gas stream, can remove pollutants such as $SO_2$ from the gas stream via chemical reaction with basic aqueous liquid, can remove pollutants such as mercury from the gas stream via reaction or absorption with activated carbon nanocomposite sorbent in the scrubber, or any suitable combination thereof. In addition to, or as an alternative to, the injection and promotion of carbon nanocomposite sorbent prior to unit 140, promoter 120 or promoter precursor can be provided to the aqueous scrubber 190. The promoter or promoter precursor can be injected into gas stream 42, or can be provided directly into the scrubber (transport lines between 120/130 and 190 not shown). The promoter or promoter precursor can be provided before or into the scrubber 190 as a carbon nanocomposite sorbent coated or combined with the promoter or promoter precursor. Promotion of a coated or combined sorbent/precursor can occur in the scrubber 190, in the gas stream 42 prior to the scrubber, or in a heated carrier gas line (not shown) that brings the activated nanocomposite to 42 or 190. In addition to, or as an alternative to, the injection and promotion of carbon nanocomposite sorbent prior to unit 140, carbon nanocomposite can be provided to the aqueous scrubber 190. The carbon nanocomposite can be injected into gas stream 42, or can be provided directly into the scrubber (transport lines between 110 and 190 not shown). The aqueous solution in the scrubber can be regenerated or replaced in a batchwise or continuous process, to remove absorbed particulate, absorbed pollutant, or absorbed pollutant byproducts.

An optional continuous emission monitor (hereinafter "CEM") 205 for mercury is provided in exhaust gas stream 35 to provide electrical signals representative of the mercury concentration in exhaust stream 35 as a function of time. The optional mercury CEM 205 and flow controllers 201, 202, 203, 207, 208, and 209 are electrically connected via optional lines 227 (or wirelessly) to an optional digital computer (or controller) 206, which receives and processes signals and can control the preparation and injection of promoted carbon sorbent into polluted flue gas stream 15.

In an example operation, a carbon nanocomposite sorbent and/or an optional promoter, and/or an optional alkali component, can be injected into polluted flue gas stream 15. After contacting the injected material with the polluted flue gas stream 15, the injected material reduces the mercury concentration, transforming polluted flue gas into reduced mercury flue gas stream 25. The injected material can be removed from the reduced mercury flue gas stream 25, by separator 140, disposed of or further separated by optional separator 150, and disposed of or regenerated by an optional regenerator 160, respectively. Alternatively or in addition, scrubber 190 can remove $SO_2$, pollutants such as mercury via promoted carbon nanocomposite, remove particulate, or any combination thereof. The reduced mercury "clean" flue gas stream 42 and/or 35 is then monitored for mercury content by an optional CEM 205, which provides corresponding signals to an optional computer/controller 206. Logic and optimization signals from 206 then can adjust flow controllers 201, 202, 203, 207, 208, 209 to maintain the mercury concentration in exhaust stream 35 within desired limits, according to control algorithms well known in the art. Flow controllers 201, 202, 203, 207, 208, 209 can also be adjusted manually or by some other automated means to maintain the mercury concentration in exhaust stream 35 within desired limits, according to control algorithms well known in the art.

Referring still to FIG. 3A, there are illustrated several embodiments for preparation and injection of carbon nanocomposite sorbents, promoted carbon sorbents, halogen and halide promoters, and/or alkali components. Stream 111 provides for introduction of carbon nanocomposite sorbent from reservoir 110, as metered by flow controller 201 manually or under the direction of computer 206. The halogen/halide can be combined and react with the carbon nanocomposite sorbent according to any of several provided methods. The halogen/halide (120 and/or 130) can be combined via transport line 121 (and/or 131) directly into transport line 115 (or 113), within which it contacts and reacts with the carbon nanocomposite sorbent (e.g., in reservoir 110) prior to injection point 116 (or 114). This option is one form of what is referred to herein as "in-flight" preparation of a promoted carbon sorbent in accordance with the invention. Further, the halogen/halide (120 and/or 130) can be combined via flue gas stream 15 by transport line 121 (and/or 131) into transport line 115 and injection point 116 which it contacts and reacts with the carbon nanocomposite (e.g., from reservoir 110) in flue gas stream 15 after the carbon nanocomposite is transported in transport line 113 and injected at injection point 114. This option is another form of what is referred to herein as "in-flight" preparation of a promoted carbon nanocomposite sorbent in accordance with the invention. Further, the halogen/halide can be combined via transport line 121$b$ with carbon nanocomposite sorbent prior to entering transport line 113 and/or 115. Still further, the halogen/halide can be contacted and react with the carbon nanocomposite sorbent by introduction via transport line 121$c$ into reservoir 110. This option can be employed when, for example, reservoir 110 includes an ebulliated or fluidized bed of carbon nanocomposite sorbent, through which halogen/halide flows in gaseous form or as a vapor. In other embodiments, the halogen/halide can be contacted with the carbon nanocomposite sorbent in liquid form or in a solvent, as discussed previously, and solvent removal (not shown in FIG. 3A) can then be provided if necessary as mentioned with respect to embodiments discussed with reference to FIG. 1.

Similarly, the optional secondary component can be contacted and react directly in transport line 115 (and/or 113) via transport line 131, or optionally as described above with respect to the halogen/halide, via transport lines 131$b$ and 131$c$.

Similarly, the optional alkali component from reservoir 180 can either be added in transport line 113 and/or 115 directly, or can be injected separately by transport line 118, remaining separate and/or combining downstream in flue gas stream 15 for synergistic effects with carbon nanocomposite sorbent, promoted carbon, or optional secondary components. On-site variation of the amount of the optional alkali component relative to carbon nanocomposite sorbent, promoted carbon, or optional secondary components can be optimized for site-specific operating and flue gas conditions.

Figure 3B:
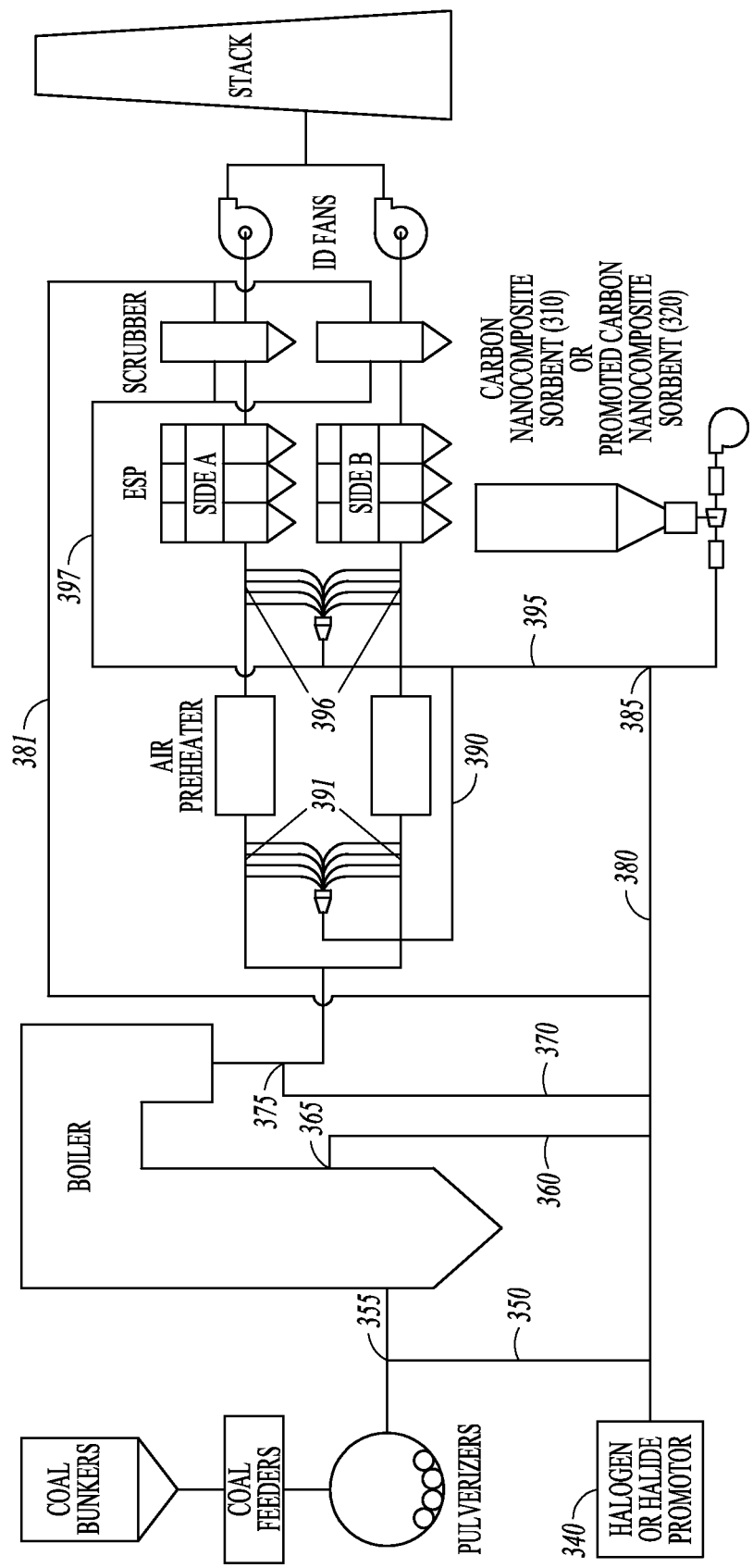

FIG. 3B shows a schematic flow diagram of mercury control system 300 including preparation of promoted carbon sorbents and flue gas mercury reduction in accordance with embodiments of the present invention. Carbon sorbent 310 can be injected through line 395 to location 396 or injected through line 390 to location 391. Promoted carbon sorbent 320 can be injected through line 395 to location 396 or injected through line 390 to location 391. Carbon sorbent 310 can be promoted in-flight, such as via injection of carbon sorbent 310 through line 390 and/or 395 to location 391 and/or 396 with halogen/halide promoter 340 through line 380 to location 385 or via injection of carbon sorbent 310 through line 390 and/or 395 to location 391 and/or 396 with halogen/halide promoter 340 through line 350 to location 355 and/or halogen/halide promoter 340 through line 360 to location 365 and/or halogen/halide promoter 340 through line 370 to location 375.

In addition to or as an alternative to use of promoted carbon nanocomposite prior to the optional ESP unit, the optional scrubber unit can be used for removal of pollutants such as mercury via use of promoted carbon in the scrubber, removal of pollutants such as $SO_2$ via use of basic aqueous solution in the scrubber, removal of particulates in the scrubber, or any combination thereof. Injection of materials such as promoter or carbon nanocomposite sorbent to the scrubber can occur in the scrubber or between the ESP and the scrubber. Promoted sorbent 320 can be injected through line 397 into the scrubber. Carbon sorbent 310 can be promoted in-flight, such as via injection of carbon sorbent 310 through a heated carrier line (not shown) with promoter 340 to the scrubber. Halogen/halide promoter 340 can be added to the scrubber through line 381, while carbon sorbent 310 is added via line 397, and the sorbent can be promoted within the scrubber.

In some embodiments wherein contacting between components and reaction is performed in a liquid or solvent phase, stirring of such liquid and/or slurry mixtures can be provided. In some embodiments, the halogen/halide promoter and optional secondary component(s) can be sprayed in solution form into or on the carbon nanocomposite sorbent. In some such embodiments, drying, filtering, centrifugation, settling, decantation, or other solvent removal methods as are known in the art can then be provided.

In embodiments wherein the halogen/halide promoter is in gaseous or vapor form, it can be diluted in air, nitrogen, or other gas as appropriate. The halide/halogen gas, for example, gaseous HBr or $Br_2$, can be passed through an ebulliated or fluidized bed of granular or fibrous carbon nanocomposite sorbent, with the promoted carbon sorbent so produced removed from the top of the bed via gas entrainment for injection.

In some embodiments, the secondary component(s) can include iodine or other halogens, hydrohalides, including without limitation HI, HBr, HCl, a Group V or Group VI element with a molecular halogen, such as $SCl_2$ and others. In some embodiments, the promoted carbon sorbent can include from about 1 g to about 30 g halogen/halide per 100 g carbon nanocomposite sorbent. In some embodiments, the promoted carbon sorbent can include a secondary component in concentration of from about 1 wt % to about 15 wt % of the concentration of the halogen/halide component.

In still other embodiments, the promoted carbon nanocomposite sorbent can be applied to a substrate. In other embodiments, such prepared substrate(s) can be caused to contact a polluted flue gas or gasification system product gas stream for mercury reduction purposes. Such substrates can be monolithic, rotating, moving, or exposed to the gas stream in any number of ways known to those skilled in the art. Substrates can include, for example, honeycomb structures, fabrics, filters, plates, and the like.

EXAMPLES

The present invention can be better understood by reference to the following examples which are offered by way of illustration. The present invention is not limited to the examples given herein.

Example 1

Mesoporous Activated Carbon (AC) Nanocomposites from Commercial Cane Molasses

Example 1.1

NanoG-CM

High-surface-area montmorillonite (clay) obtained from Aldrich (200 g) was added rapidly to Brer Rabbit molasses (nonsulfurated) diluted with a smaller amount of water (200 g/140 mL) and stirred to make a thick paste.

As soon as all the clay was wetted with the molasses, the paste was dried overnight at 110° C. to remove excess water. Alternatively, a smaller portion of the paste was heated for 1 min in a microwave. A smaller batch was dried more quickly (1 hour) in the oven at 110° C.

The dried solid was loaded in two batches in a cylindrical steel tube and heated to 700° C. in a tube furnace with a flow of nitrogen through the bed. The effluent gas was bubbled through a water trap. Heating was continued for 1 hour. The tube was cooled slowly to ambient under nitrogen and emptied. The resulting black chunks of composite carbon were weighed and ground in a mortar and pestle. The product nanocomposite was separated into two sieve sizes, greater than 325 mesh and about 325 mesh. The about 325 mesh material was used for the Hg capture tests.

Yield of nanocomposite was 217 g.

Example 1.2

NanoG-CB

Preparation was similar to NanoG-CM, except high-sodium bentonite was substituted for the montmorillonite. Yield was 10.1 g from 10.0 grams of bentonite.

Example 1.3

Impregnation of Promotion Agent

Example 1.3.1

Ammonium Bromide

An aqueous solution of ammonium bromide (7.3 g/35 mL) was added to 54 g of 325-mesh nanocomposite and stirred to form a paste. The paste was dried at 110° C. and reground.

Example 1.3.2

Hydrogen Bromide

Aqueous HBr (0.1 N) was added to NanoG-CM (10 g) and the mixture stirred for 1 hr. The slurry was filtered and dried at 110° C.

Example 1.3.3

Bromine

Bromine vapor (0.5 g) was transferred to a vial containing the powdered composite (10 g), where it was adsorbed.

Example 1.3.4

Sulfur

Elemental sulfur (1 g) was dissolved in carbon disulfide (20 mL), and 10 g of NanoG-CM was added. After being stirred overnight, the carbon disulfide was removed.

Example 2

Mesoporous Activated Carbon Nanocomposites from American Crystal Sugar (ACS) Raffinate The previous versions of the NanoG-CM carbon composites were prepared using cane sugar molasses. Using the local ACS molasses would provide a more convenient source; e.g., a low-value raffinate remaining from sugar and betaine extraction is available in large amounts (approximately 170 tons). However, the amount of dissolved inorganic salts is much higher (>10%) than commercial cane molasses, and the sugar content is lower.

Nanocomposites were prepared using the ACS raffinate and two types of clay: a highly swelling, high-sodium bentonite and a low-swelling montmorillonite from Aldrich. Both were ground finely.

Example 2.1

NanoG-ACSB

The bentonite was swelled by adding 10 g of dry bentonite to 80 g of water and grinding with a mortar and pestle. ACS raffinate (10 g) was added to the gelled mixture and mixed by grinding. After standing overnight to further disperse the sugar in the raffinate into the clay, the mixture was heated in a microwave at full power for 1 minute to develop macroporosity in the gel. The gel was dried overnight in a drying oven at 110° C.

The dried solid was loaded in two batches in a cylindrical steel tube and heated to 700° C. in a tube furnace with a flow of nitrogen through the bed. The effluent gas was bubbled through a water trap. Heating was continued for 1 hr. The tube was cooled slowly to ambient under nitrogen and emptied. The resulting black chunks of composite carbon were weighed and ground in a mortar and pestle.

Yield of nanocomposite was 10.2 g.

Example 2.2

NanoG-2ACSB

Preparation was similar to NanoG-ACSB except the weight of raffinate added was doubled. Yield was 10.5 g.

Example 2.3

NanoG-2ACSM

Preparation was similar to NanoG-CM, using 10 g of Aldrich montmorillonite and 20 g of ACS raffinate was used and the amount doubled. Yield was 10.5 g.

Example 2.4

NanoG-2ACSB-Washed

A sample of NanoG-2ACSB was stirred with water overnight, filtered, and then stirred with 0.1 N HBr for 2 hr. The slurry was filtered, and the composite was dried at 110° C.

Example 2.5

Impregnation of Promotion Agent

Example 2.5.1

Ammonium Bromide

An aqueous solution of ammonium bromide (1.1 g/5 mL) was added to 10 g of nanocomposite and stirred to form a paste. The paste was dried at 110° C. and reground.

Example 2.5.2

Bromine

Bromine vapor (0.5 g) was transferred to a vial containing the powdered composite, where it was partially adsorbed (chemisorbed).

Example 3

Bench-Scale Hg Sorption Tests of NanoG Sorbents

Bench-scale Hg sorption tests were conducted to evaluate the performance of the sorbents in a bed configuration for sorption of elemental Hg vapor in flue gas. These results are summarized in Table 1. While not as accurate at evaluating performance in an injection mode with very short contact time, the initial reactivity (as % Hg capture) and the initial slope gave a preliminary determination of reactivity in a short time scale. When the initial slope is flat, there are many active sites, and a higher reactivity has been found. A steep initial slope relates to fast breakthrough and corresponding lower reactivity.

The NanoG composite sorbents prepared from the cane molasses (NanoG-CM) gave excellent reactivities (98%-99% capture) at the start of the experiment and continued with high capture efficiency for 15 minutes (flat slope). On the other hand, the ACS raffinate gave lower reactivities and lower capacities (shorter 50% breakthrough times) compared with the composites prepared from cane sugar molasses. The amounts of carbon contained in the ACS composites were considerably less, owing to the lower sugar content, higher salt content and, perhaps, different burn-off rate. The composites prepared with double the amount of molasses were less reactive than the lower dosage. These results could be explained by salt blockage in the pores of the composites from the ACS raffinate. The evolution of large amounts of $H_2S$ when water was added to the sorbents is consistent with the formation of $K_2S$ in the pores resulting from reduction of sulfate as well as the high potassium concentration. When the ACS raffinate sorbent was washed to dissolve out the salts, the reactivity and capacity improved considerably.

TABLE 1

Summary Results for Fixed-Bed Screening of NanoG Sorbents

| Sorbent | Promotion Reagent | Initial Reactivity, % Hg Capture | Initial slope | 50% Breakthrough, Time, hr |
|---|---|---|---|---|
| NanoG-CM | $Br_2$ | 98 | Flat | 0.45 |
| NanoG-CM | $NH_4Br$ | 99 | Flat | 0.38 |
| NanoG-CM | HBr | 97 | Moderate | 0.29 |
| NanoG-CM | S | 92 | Steep | 0.06 |
| NanoG-2ACSM | $Br_2$ | 67 | Steep | 0.02 |
| NanoG-2ACSB | $Br_2$ | 95 | Steep | 0.16 |
| NanoG-2ACSB | $NH_4Br$ | 90 | Steep | 0.29 |
| NanoG-ACSB | $NH_4Br$ | 97 | Moderate | 0.32 |
| NanoG-2ACSB-washed | $Br_2$ | 97 | Moderate | 0.53 |

Although sulfurization of ACs produces carbons with good reactivities for Hg, the addition of sulfur to the NanoG sorbent did not result in a good capacity. It is likely that the sulfur blocked the pores in the limited amount of carbon porosity available in these sorbents.

A comparison of HBr with $Br_2$ showed that $Br_2$ gave higher reactivity and capacity. A reason for this may be that carbenium-bromide ion pairs in these composite sorbents are less hydrated and more reactive in the sorbents produced by vapor deposition.

The ammonium bromide-promoted sorbents gave very good reactivities and capacities, consistent with decomposition of the ammonium bromide in the pores on heating forming ammonia and gaseous HBr. The HBr combines with carbon deposited on the proximate nanocarbon surfaces decorating the clay layers (sheets). Also, the ammonia is trapped inside the acidic clay layers of the composite where it is available for intercepting the $SO_2$ in the flue gas before it can oxidize on the carbon surface.

Example 4

Pilot-Scale Evaluation

NanoG-CM was evaluated at the pilot scale during a Center for Air Toxic Metals® (CATM®)-sponsored run of the particulate test combustor (PTC). The coal for that evaluation was a subbituminous Montana Powder River Basin (PRB) (Absaloka), and comparisons were made to a commercially available untreated carbon.

Figure 4:
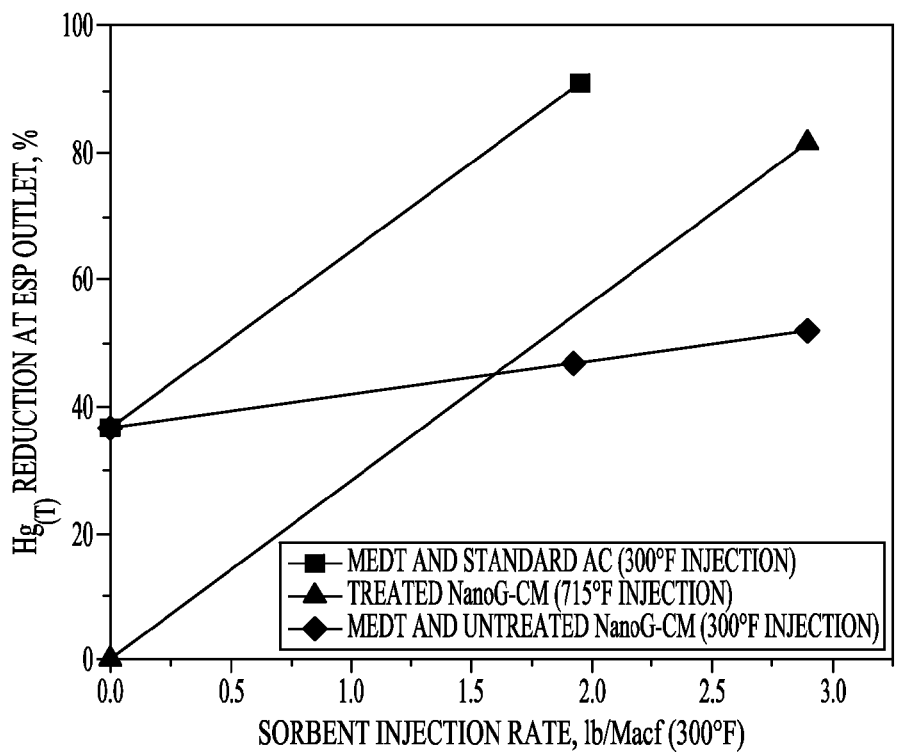
FIG. 4 illustrates particulate test combustor (PTC) results for NanoG-CM testing, in accordance with various embodiments.

Results from the PTC tests are summarized in FIG. 4 for the commercially available standard AC and two options with NanoG-CM. FIG. 4 shows PTC results for NanoG-CM testing on a total-injected-sorbent basis. The standard AC and the untreated NanoG-CM were tested with the moderate energy dissociation technology (MEDT) sorbent enhancement additive (SEA) option. As indicated in the figure, the results were better with the standard AC; however, the NanoG-CM did show potential for in-flight capture. More promising results were obtained with a treated sample of NanoG-CM. It was determined through a set of tests performed for MEDT SEA development that the pretreatment used with NanoG-CM was most effective at pre-air heater temperatures. Therefore, during evaluation of the treated NanoG-CM, it was injected into the ductwork at a point where the flue gas temperature was approximately 715° F.

Figure 5:
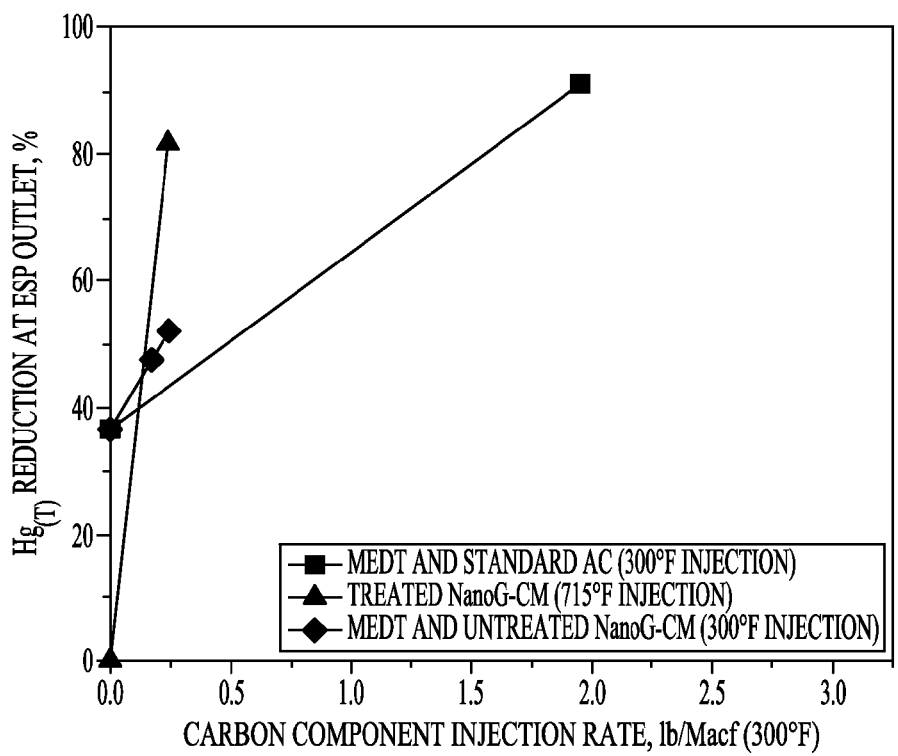
FIG. 5 illustrates PTC results for NanoG-CM testing, in accordance with various embodiments.

FIG. 4 suggests that the NanoG-CM material shows potential as an in-flight mercury sorbent, but the total injected sorbent rates are higher than those with the standard AC. However, an alternate comparison is to evaluate the test results on a carbon component basis, since the underlying economic assumption for composite sorbents is that the AC component is perhaps an order of magnitude more expensive than the inorganic substrate. The results from FIG. 4 have been rescaled in FIG. 5 to depict the equivalent carbon-only injection rate for the three options. FIG. 5 shows PTC results for NanoG-CM testing on a carbon-component basis. The standard AC results remain unchanged because they were considered 100% AC (mineral components of the carbon were not deducted), but the NanoG-CM data reflect much lower carbon-only injection rates since the average carbon content for NanoG-CM was only 8%.

The carbon-only results of FIG. 5 demonstrate at least one of the beneficial aspects of the nanocomposite sorbents: increased carbon utilization. Comparison of the standard AC and the NanoG-CM results in FIG. 5 suggests that the bulk of the standard AC's carbon content (e.g., the interior portion) goes unused and is not a factor in overall mercury capture. This reinforces a mechanistic understanding that predominantly the surface and near-surface sites are important for in-flight capture of mercury. Improved carbon utilization can have a beneficial effect on consumable sorbent cost, for example, if the base material cost advantage is not outweighed by added or more complicated production steps. Furthermore, improved carbon utilization can make it easier for utilities to meet carbon content restrictions in fly ash, for example, in fly ash destined for use in concrete.

Figure 6:
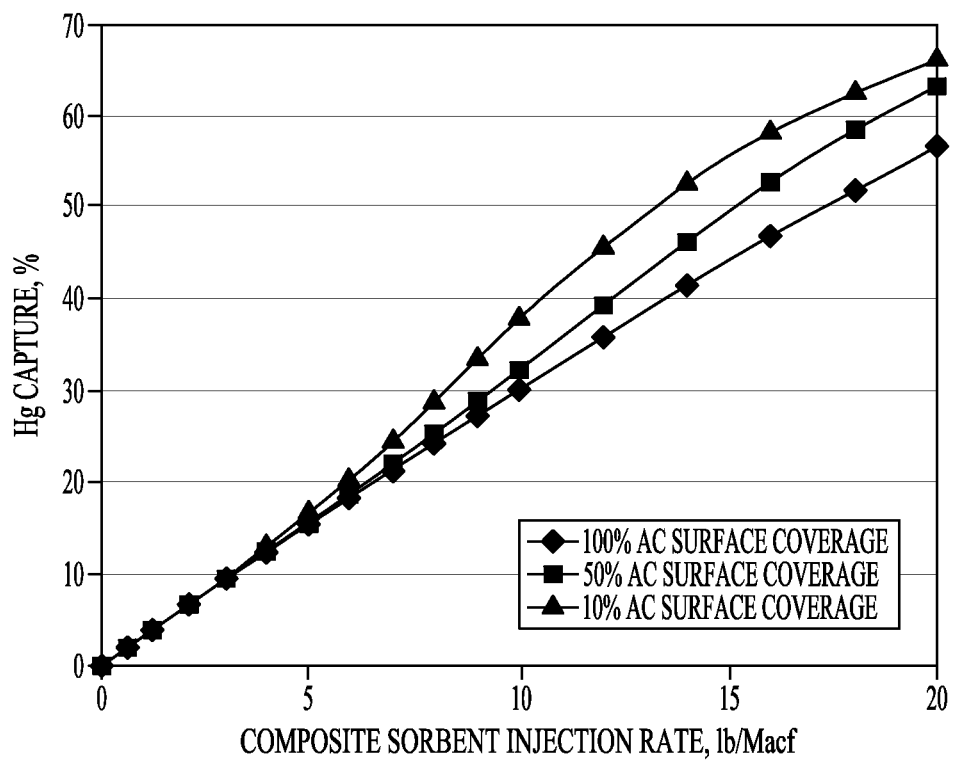
FIG. 6 illustrates model results for in-flight mercury capture with a composite sorbent in a high-sulfur flue gas, in accordance with various embodiments.

Synergistic effects between the carbon layer and the interior substrate can be an advantage of the carbon nanocomposite sorbent. In one example, a synergistic effect could arise from a single particle including two sorbents: a conventional AC and an inorganic substrate that may be reactive toward acid gas components in flue gas. To support the potential benefits of a nanocomposite sorbent, an applied model for in-flight capture was used with results presented in FIG. 6, for composite sorbents with varying activated carbon surface coverage. FIG. 6 shows model results for in-flight mercury capture with a composite sorbent in a high-sulfur flue gas (3000 ppm $SO_2$, 15 ppm $SO_3$). The modeled flue gas was representative of a high-sulfur coal with significant amounts of $SO_3$ that limit mercury capture, as indicated by the 100% AC reference curve. An estimate of the synergistic benefit of the composite sorbent is shown by the 50% and 10% AC curves. Given the conservative assumptions that were used, benefits can exceed those shown by the model.

The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art and that such modifications and variations are considered to be within the scope of this invention as defined by the appended claims.

Additional Embodiments

The present invention provides for the following exemplary embodiments, the numbering of which is not to be construed as designating levels of importance:

Embodiment 1 provides a method for separating a material from a gas that includes the material, including providing or obtaining a carbon nanocomposite sorbent; contacting at least some of the material with the sorbent, to form a material-sorbent composition; and separating at least some of the material-sorbent composition from the material-containing gas, to give a separated gas.

Embodiment 2 provides the method of Embodiment 1, wherein the material is a pollutant.

Embodiment 3 provides the method of Embodiment 2, wherein the pollutant is mercury.

Embodiment 4 provides the method of any one of Embodiments 2-3, further including providing a promoter; and promoting at least a portion of the sorbent material by chemically reacting the portion of the sorbent material with the promoter to form a promoted sorbent; wherein the sorbent that contacts at least some of the pollutant includes the promoted sorbent.

Embodiment 5 provides the method of Embodiment 4, wherein the promoter is a halogen or halide promoter.

Embodiment 6 provides a method for reducing the pollutant content of a pollutant-containing gas, including providing or obtaining a carbon nanocomposite sorbent material; providing or obtaining a halogen or halide promoter; promoting at least a portion of the sorbent material by chemically reacting the portion of the sorbent material with the halogen or halide promoter to form a promoted sorbent; contacting at least part of the promoted sorbent with the pollutant in the pollutant-containing gas, to form a pollutant-sorbent composition; and separating particulates from the pollutant-containing gas, the particulates including at least some of the pollutant-sorbent composition, to give a cleaned gas.

Embodiment 7 provides the method of Embodiment 6, wherein the pollutant is mercury.

Embodiment 8 provides the method of any one of Embodiments 6-7, wherein obtaining or providing the carbon nanocomposite sorbent includes providing or obtaining a carbon precursor; providing or obtaining a substrate material; contacting the carbon precursor and the substrate material, to provide a nanocomposite starting material; heating the nanocomposite starting material, to provide the carbon nanocomposite sorbent.

Embodiment 9 provides the method of Embodiment 8, further including allowing the heated nanocomposite starting material to react with an acid or a base, to provide the carbon nanocomposite sorbent.

Embodiment 10 provides the method of any one of Embodiments 8-9, wherein the carbon precursor includes a carbohydrate.

Embodiment 11 provides the method of any one of Embodiments 8-10, wherein the carbon precursor includes brown sugar, barley sugar, caramel, cane sugar, corn syrup, starch, molasses, or a sugar waste product.

Embodiment 12 provides the method of any one of Embodiments 8-11, wherein the substrate material includes diatomaceous earth, clay, zeolite, or mineral.

Embodiment 13 provides the method of any one of Embodiments 8-12, wherein the heating includes heating to greater than about 100° C.

Embodiment 14 provides the method of any one of Embodiments 6-13, wherein the sorbent material includes binding sites that bind with the pollutant in the pollutant-containing gas.

Embodiment 15 provides the method of any one of Embodiments 6-14, wherein the sorbent material includes carbon that has been allowed to react or become impregnated with halogens, hydrogen halides, and Group V and Group VI halides to form pollutant binding sites in the promoted sorbent.

Embodiment 16 provides the method of Embodiment 15, wherein the binding sites in the promoted AC bind to the pollutant in the pollutant-containing gas to form the pollutant-sorbent composition.

Embodiment 17 provides the method of any one of Embodiments 15-16, wherein the binding sites in the promoted AC react with the pollutant in the pollutant-containing gas to form the pollutant-sorbent composition.

Embodiment 18 provides the method of any one of Embodiments 15-17, wherein at least a portion of the binding sites of the AC react with oxidized pollutant in the pollutant-containing gas to form another pollutant-sorbent chemical composition.

Embodiment 19 provides the method of any one of Embodiments 6-18, wherein the step of separating particulates from the pollutant-containing gas includes separating in a particulate separator including one or more ESPs.

Embodiment 20 provides the method of any one of Embodiments 7-19, wherein the mercury in the mercury-containing gas includes elemental mercury.

Embodiment 21 provides the method of any one of Embodiments 7-20, wherein the mercury in the mercury-sorbent composition is oxidized mercury.

Embodiment 22 provides the method of any one of Embodiments 7-21, wherein the promoted sorbent combines with at least about 70 wt % of the mercury present in the mercury-containing gas.

Embodiment 23 provides the method of any one of Embodiments 6-22, wherein the halogen or halide promoter is in a form including a vapor form, a solid form, in a solvent, or a combination thereof.

Embodiment 24 provides the method of any one of Embodiments 6-23, wherein the halogen or halide promoter includes at least one of Group V halide, Group VI halide, or mixtures thereof.

Embodiment 25 provides the method of any one of Embodiments 6-24, wherein a promoter precursor on the sorbent or injected with the sorbent transforms into the halogen or halide promoter that reacts with the sorbent.

Embodiment 26 provides the method of any one of Embodiments 6-25, wherein the halogen or halide promoter is $NH_4Br$, $NaBr$, $HBr$, $NaCl$, $CaCl_2$, or $HCl$.

Embodiment 27 provides the method of any one of Embodiments 6-26, further including injecting an alkaline component into the pollutant-containing gas.

Embodiment 28 provides the method of Embodiment 27, wherein the alkaline component includes an oxide, hydroxide, carbonate, or phosphate of an alkali or alkaline-earth element.

Embodiment 29 provides the method of any one of Embodiments 6-28, further including adding an additional halogen or halide promoter to the promoted sorbent.

Embodiment 30 provides the method of Embodiment 29, wherein the additional halogen or halide promoter includes HI, HBr, HCl, a Group V element with halogen, or a Group VI element with halogen.

Embodiment 31 provides the method of any one of Embodiments 6-30, further including adding a stabilizing agent to the promoted containing sorbent.

Embodiment 32 provides the method of Embodiment 31, wherein the stabilizing agent includes at least one of S, Se, $H_2S$, $SO_2$, $H_2Se$, $SeO_2$, $CS_2$, $P_2S_5$, or mixtures thereof.

Embodiment 33 provides the method of any one of Embodiments 6-32, wherein the step of promoting at least a portion of the sorbent material occurs at least partially before the contacting of the pollutant-containing gas with the promoted sorbent.

Embodiment 34 provides the method of any one of Embodiments 6-33, further including injecting the carbon nanocomposite sorbent at an injection rate and injecting separately at least one promoter at an injection rate into a gas stream whereby in-flight reaction produces the promoted sorbent, wherein the promoter is selected from the group consisting of molecular halogens, halides, and combinations thereof, wherein the promoter is reacted in the gas phase or as a vapor, wherein the promoter is added at from about 1 to about 30 grams per about 100 grams of carbon nanocomposite sorbent material.

Embodiment 35 provides the method of Embodiment 34, wherein the gas stream is the pollutant-containing gas.

Embodiment 36 provides the method according to Embodiment 35, wherein the gas stream is a transport gas.

Embodiment 37 provides the method of any one of Embodiments 34-36, wherein the promoter injection rate and the sorbent injection rate into the gas are determined, at least in part, from a monitored pollutant content of the cleaned gas.

Embodiment 38 provides the method of any one of Embodiments 6-37, further including a step of regenerating the promoted sorbent from the pollutant-sorbent chemical composition.

Embodiment 39 provides the method of Embodiment 38, further including using the regenerated promoted sorbent to remove the pollutant from the pollutant-containing gas.

Embodiment 40 provides the method of any one of Embodiments 6-39, wherein at least one of the promoting, the contacting, or the separating, occurs in an aqueous scrubber.

Embodiment 41 provides the method of Embodiment 40, wherein the promoting occurs in the scrubber, wherein the scrubber includes an aqueous slurry that includes the promoter.

Embodiment 42 provides the method of any one of Embodiments 40-41, wherein the contacting occurs in the scrubber, wherein the scrubber includes an aqueous slurry that includes that activated carbon nanocomposite sorbent.

Embodiment 43 provides a method for reducing the mercury content of a mercury-containing gas, including providing or obtaining a carbon nanocomposite sorbent, the carbon nanocomposite sorbent made by steps including providing or obtaining a carbon precursor; providing or obtaining a substrate material; contacting the carbon precursor and the substrate material, to provide a nanocomposite starting material; and heating the nanocomposite starting material, provide the carbon nanocomposite sorbent; providing or obtaining a halogen or halide promoter; promoting at least a portion of the sorbent material by chemically reacting the portion of the sorbent material with the halogen or halide promoter to form a promoted sorbent; contacting at least part of the promoted sorbent with the mercury, to form a mercury-sorbent composition; and separating at least some of the mercury-sorbent composition from the mercury-containing gas.

Embodiment 44 provides a method of making a carbon nanocomposite sorbent, including providing or obtaining a carbon precursor; providing or obtaining a substrate material; contacting the carbon precursor and the substrate material, to provide a nanocomposite starting material; heating the nanocomposite starting material, to provide the carbon nanocomposite sorbent.

Embodiment 45 provides the carbon nanocomposite sorbent made by the method of Embodiment 44.

Embodiment 46 provides a promoted carbon nanocomposite sorbent made by a method comprising promoting at least a portion of the sorbent material of Embodiment 45 by chemically reacting the portion of the sorbent material with a halogen or halide promoter to form the promoted sorbent.

Embodiment 47 provides a mercury-sorbent composition made by contacting the carbon nanocomposite sorbent of any one of Embodiments 45-46 with a mercury-containing gas.

Embodiment 48 provides the carbon nanocomposite sorbent of any one of Embodiments 45-47 in contact with mercury or oxidized mercury.

Embodiment 49 provides a promoted carbon nanocomposite sorbent made by a method comprising promoting at least a portion of carbon nanocomposite sorbent material by chemically reacting the portion of the sorbent material with a halogen or halide promoter to form the promoted sorbent.

Embodiment 50 provides the apparatus or method of any one or any combination of Embodiments 1-49 optionally configured such that all elements or options recited are available to use or select from.

We claim:

1. A promoted carbon nanocomposite sorbent made by a method comprising:
   contacting a carbon precursor and a substrate material, wherein the carbon precursor comprises a carbohydrate, wherein the substrate material comprises diatomaceous earth, clay, zeolite, or a combination thereof, to provide a nanocomposite starting material;
   heating the nanocomposite starting material, to provide a carbon nanocomposite sorbent; and
   promoting at least a portion of the carbon nanocomposite sorbent by chemically reacting the portion of the carbon nanocomposite sorbent with a halogen or halide promoter, wherein the halogen or halide promoter is $NH_4Br$, $NaBr$, $CaBr_2$, $HBr$, or a combination thereof, to form the promoted carbon nanocomposite sorbent;
   wherein the carbon nanocomposite sorbent and the promoted carbon nanocomposite sorbent are multiphase solid materials having at least one phase having at least one dimension that is about 1-1000 nm or having a repeat distance separating at least some of the phases of about 1-1000 nm.

2. The promoted nanocomposite sorbent of claim 1, wherein the carbon precursor comprises brown sugar, barley sugar, caramel, cane sugar, corn syrup, molasses, starch, a sugar waste product, or a combination thereof.

3. The promoted nanocomposite sorbent of claim 1, wherein the heating comprises heating at about 100° C. to about 1200° C.

4. The promoted carbon nanocomposite sorbent of claim 1, wherein the halogen or halide promoter is in a form comprising a vapor form, a solid form, in a solvent, or a combination thereof.

5. The promoted carbon nanocomposite sorbent of claim 1, wherein the halogen or halide promoter comprises at least one of Group V halide, Group VI halide, or a mixture thereof.

6. The promoted carbon nanocomposite sorbent of claim 1, wherein a promoter precursor transforms into the halogen or halide promoter that reacts with the carbon nanocomposite sorbent.

7. The promoted carbon nanocomposite sorbent of claim 1, wherein about 1 g to about 30 g of promoter is used per about 100 g of carbon nanocomposite material.

8. The promoted carbon nanocomposite sorbent of claim 1, wherein the promoted carbon nanocomposite sorbent comprises binding sites formed by reaction or impregnation with the halogen or halide promotor, wherein the binding sites are pollutant-absorbant.

9. The promoted carbon nanocomposite sorbent of claim 1, wherein the promoted carbon nanocomposite sorbent is pollutant-absorbent in a pollutant-containing gas.

10. The promoted carbon nanocomposite sorbent of claim 9, wherein the promoted carbon nanocomposite sorbent comprises binding sites that are pollutant-absorbant.

11. The promoted carbon nanocomposite sorbent of claim 9, wherein the pollutant is mercury.

12. The promoted carbon nanocomposite sorbent of claim 11, wherein the promoted carbon nanocomposite sorbent is configured to absorb at least about 70 wt % of the mercury present in the mercury-containing gas.

13. A method for reducing the pollutant content of a pollutant-containing gas, comprising:
    contacting at least part of the promoted nanocomposite sorbent of claim 1 with the pollutant, to form a pollutant-sorbent composition; and
    separating at least some of the pollutant-sorbent composition from the pollutant-containing gas, to give a cleaned gas.

14. The method of claim 13, wherein at least one of the promoting, the contacting, or the separating occurs in an aqueous scrubber.

15. The method of claim 14, wherein the promoting occurs in the scrubber, wherein the scrubber comprises an aqueous slurry that comprises the promoter.

16. A promoted carbon nanocomposite sorbent made by a method comprising:
    contacting a carbon precursor and a substrate material, to provide a nanocomposite starting material, wherein the carbon precursor comprises a carbohydrate, wherein the substrate material comprises diatomaceous earth, clay, zeolite, or a combination thereof;
    heating the nanocomposite starting material, to provide a carbon nanocomposite sorbent; and
    promoting at least a portion of the carbon nanocomposite sorbent by chemically reacting the portion of the sorbent material with a halogen or halide promoter, wherein the halogen or halide promoter is $NH_4Br$, NaBr, $CaBr_2$, HBr, or a combination thereof, to form a promoted carbon nanocomposite sorbent;
    wherein
        the promoted carbon nanocomposite sorbent is mercury-absorbent in a gas comprising mercury, and
        the carbon nanocomposite sorbent and the promoted carbon nanocomposite sorbent are multiphase solid materials having at least one phase having at least one dimension that is about 1-1000 nm or having a repeat distance separating at least some of the phases of about 1-1000 nm.

* * * * *